Jan. 31, 1956 S. A. GRUBICH 2,732,963
MATERIAL DIGGING AND HANDLING APPARATUS
Filed Jan. 9, 1951 34 Sheets-Sheet 2

INVENTOR.
STEPHAN A. GRUBICH
BY
*Russell + Harding*
ATTORNEYS

Jan. 31, 1956  S. A. GRUBICH  2,732,963
MATERIAL DIGGING AND HANDLING APPARATUS
Filed Jan. 9, 1951  34 Sheets-Sheet 3

INVENTOR.
STEPHAN A. GRUBICH
BY
Busser + Harding
ATTORNEYS

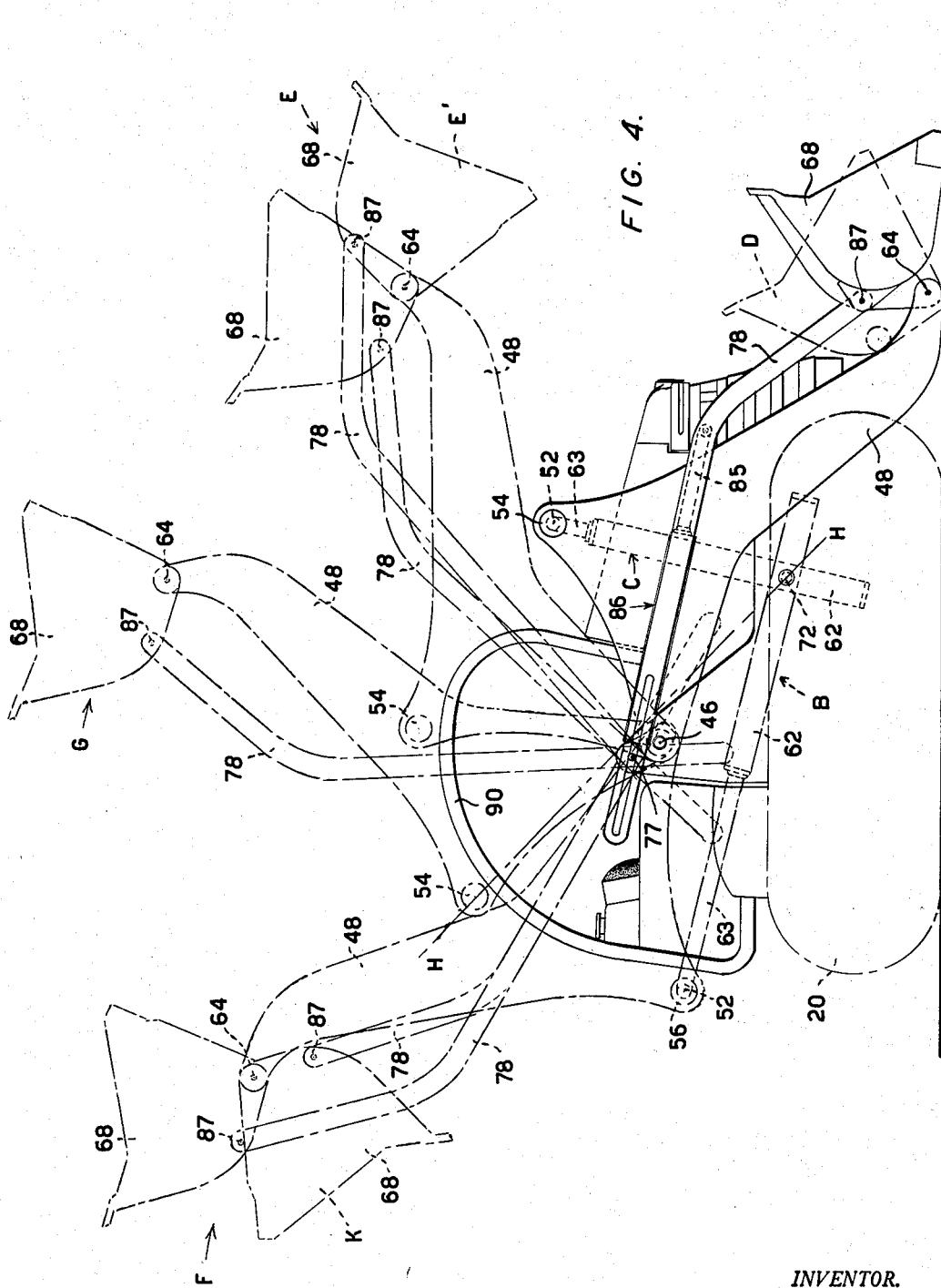

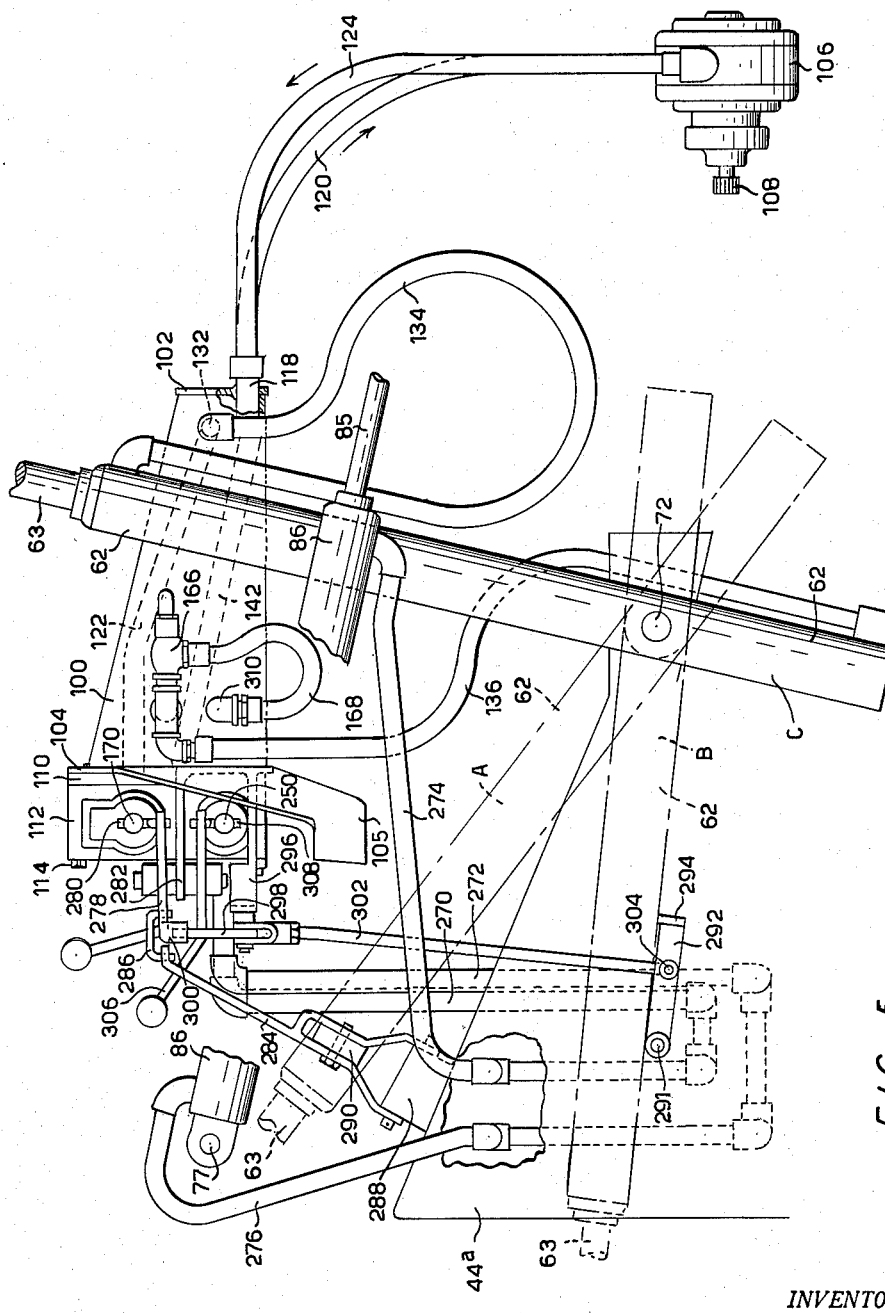

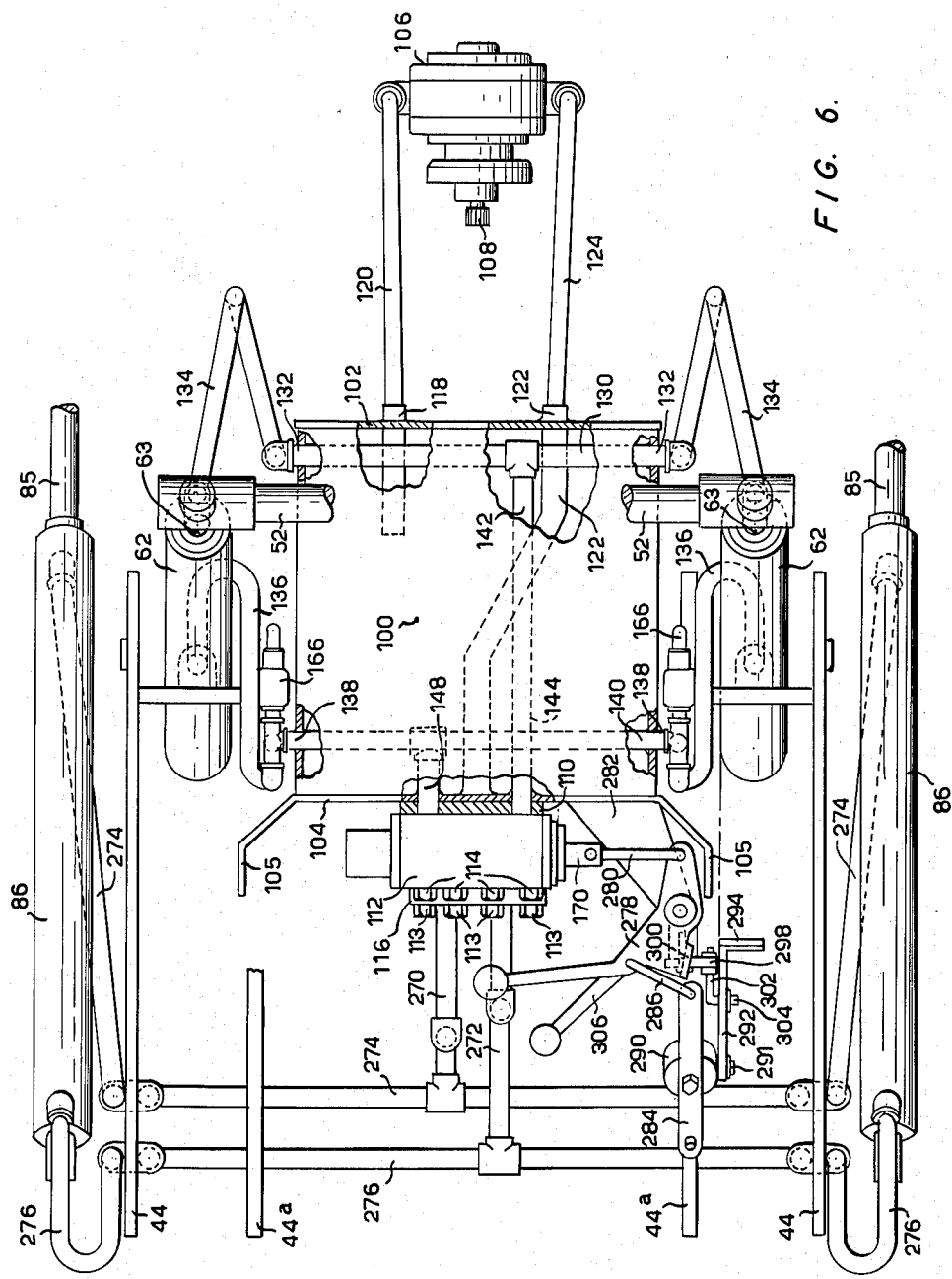

Jan. 31, 1956     S. A. GRUBICH     2,732,963
MATERIAL DIGGING AND HANDLING APPARATUS
Filed Jan. 9, 1951     34 Sheets-Sheet 7

INVENTOR.
STEPHAN A. GRUBICH
BY
Busser + Harding
ATTORNEYS

Jan. 31, 1956 S. A. GRUBICH 2,732,963
MATERIAL DIGGING AND HANDLING APPARATUS
Filed Jan. 9, 1951 34 Sheets-Sheet 8

INVENTOR.
STEPHAN A. GRUBICH
BY
Busser + Harding
ATTORNEYS

INVENTOR.
STEPHAN A. GRUBICH
BY
Busser + Harding
ATTORNEYS

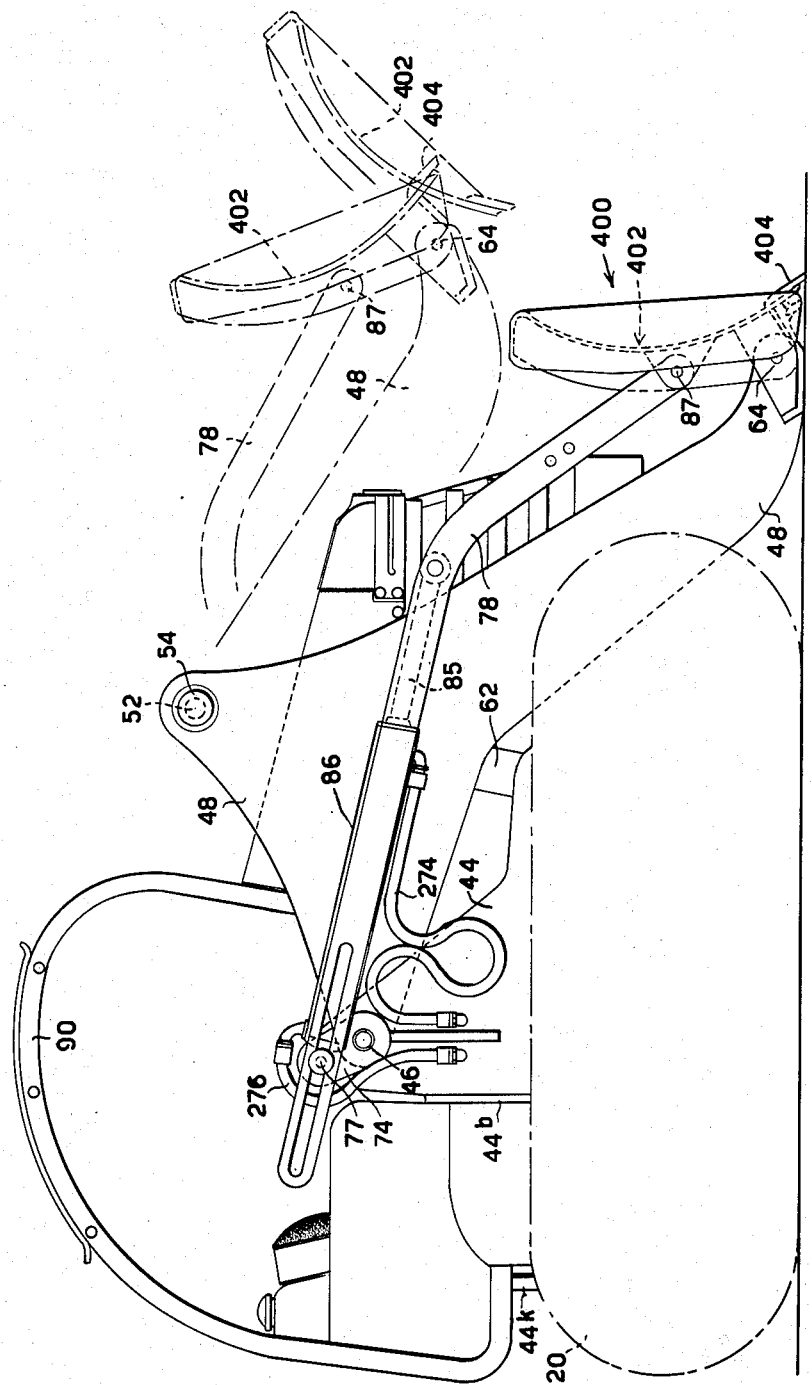

INVENTOR.
STEPHAN A. GRUBICH
BY
Busser & Harding
ATTORNEYS

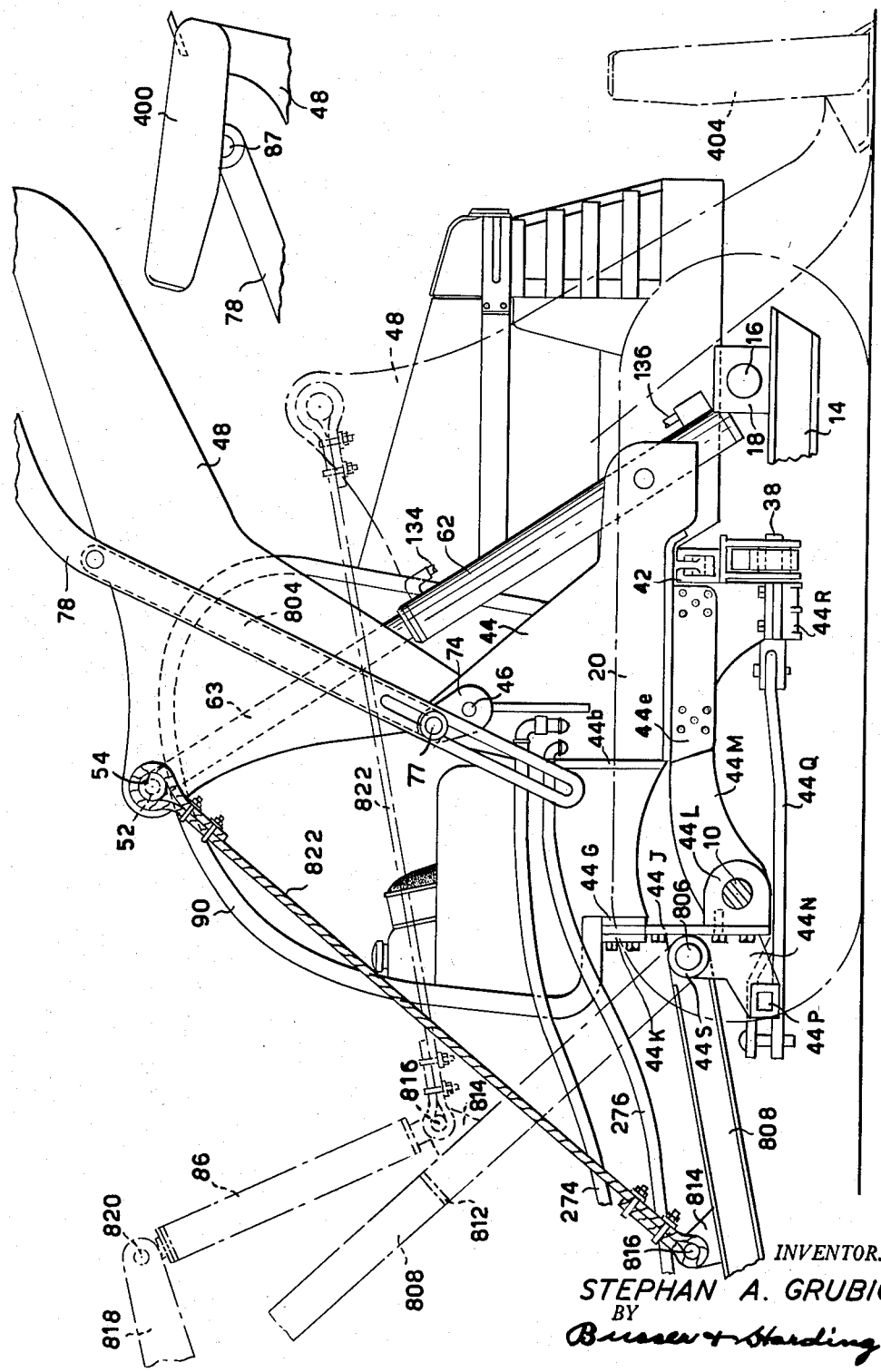

Jan. 31, 1956 S. A. GRUBICH 2,732,963
MATERIAL DIGGING AND HANDLING APPARATUS
Filed Jan. 9, 1951 34 Sheets-Sheet 19
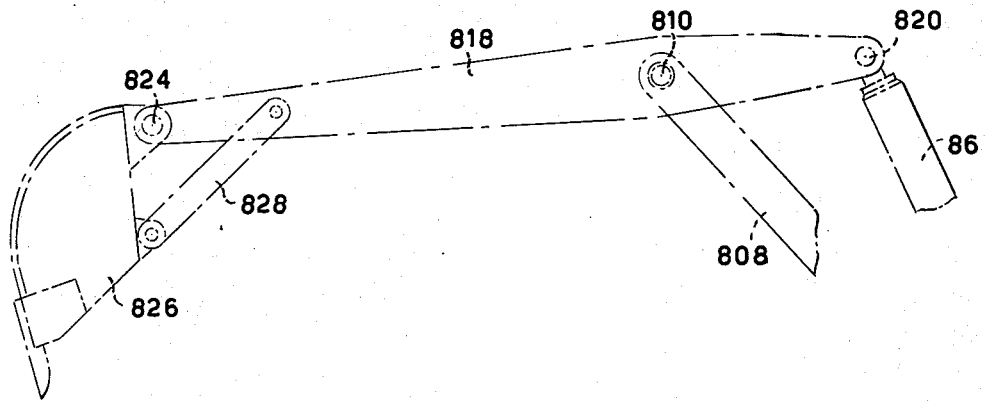
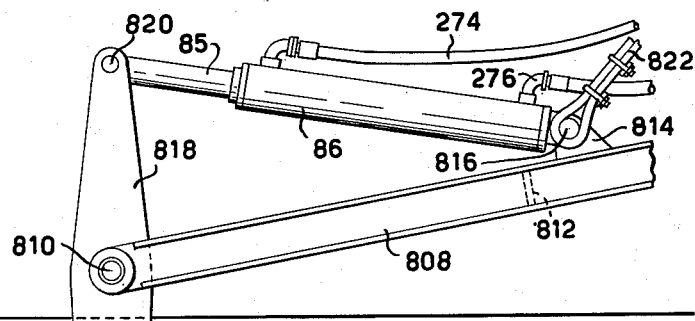
FIG. 24A.
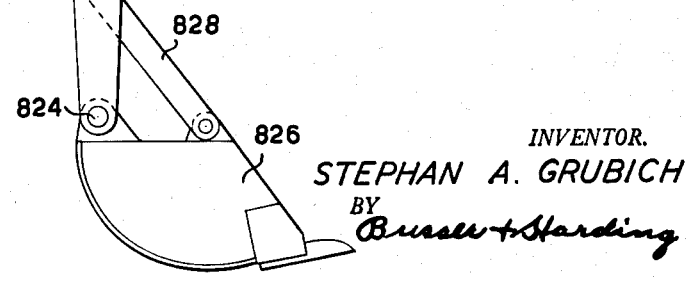
INVENTOR.
STEPHAN A. GRUBICH
BY
Russell + Harding
ATTORNEYS

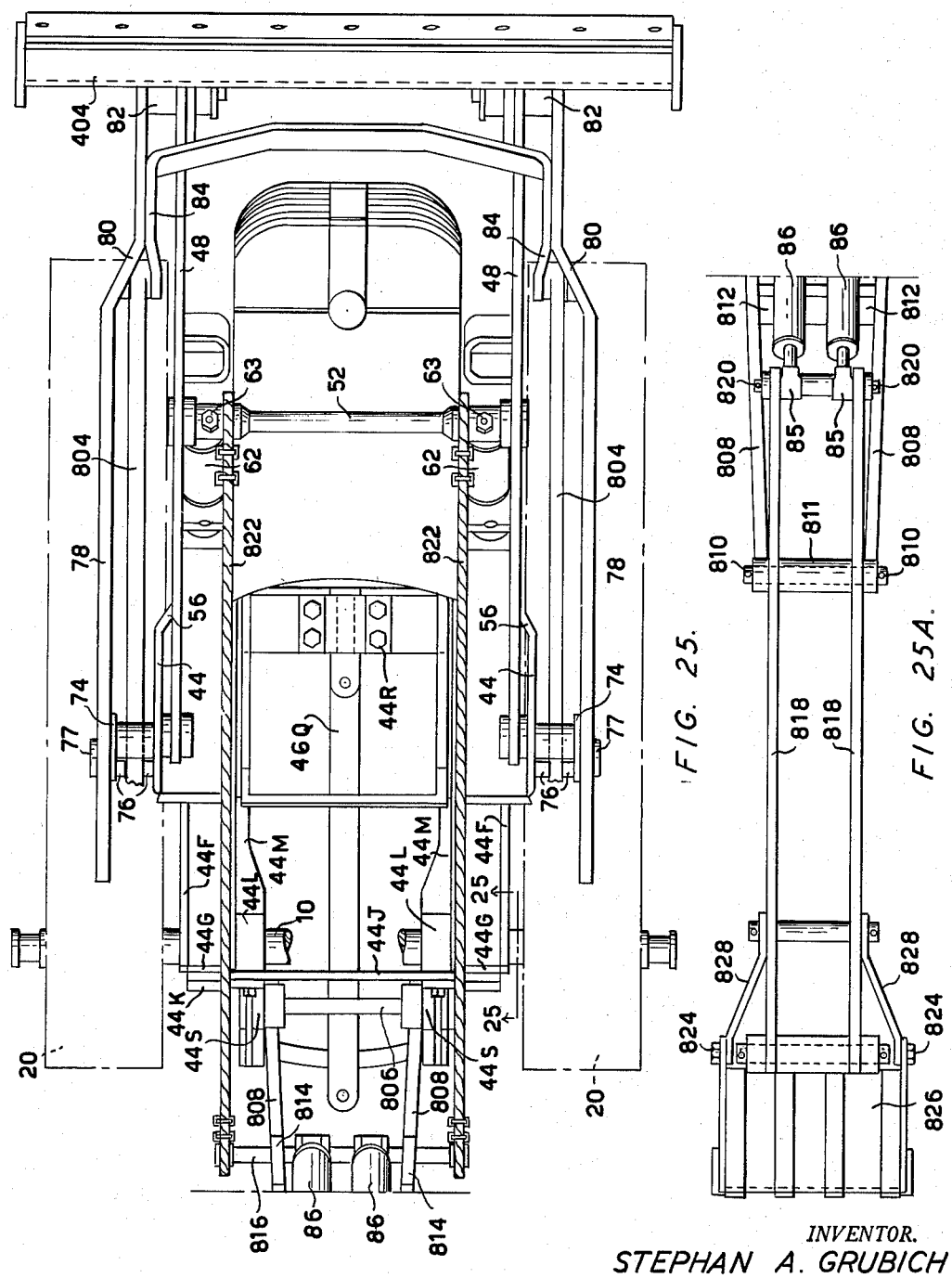

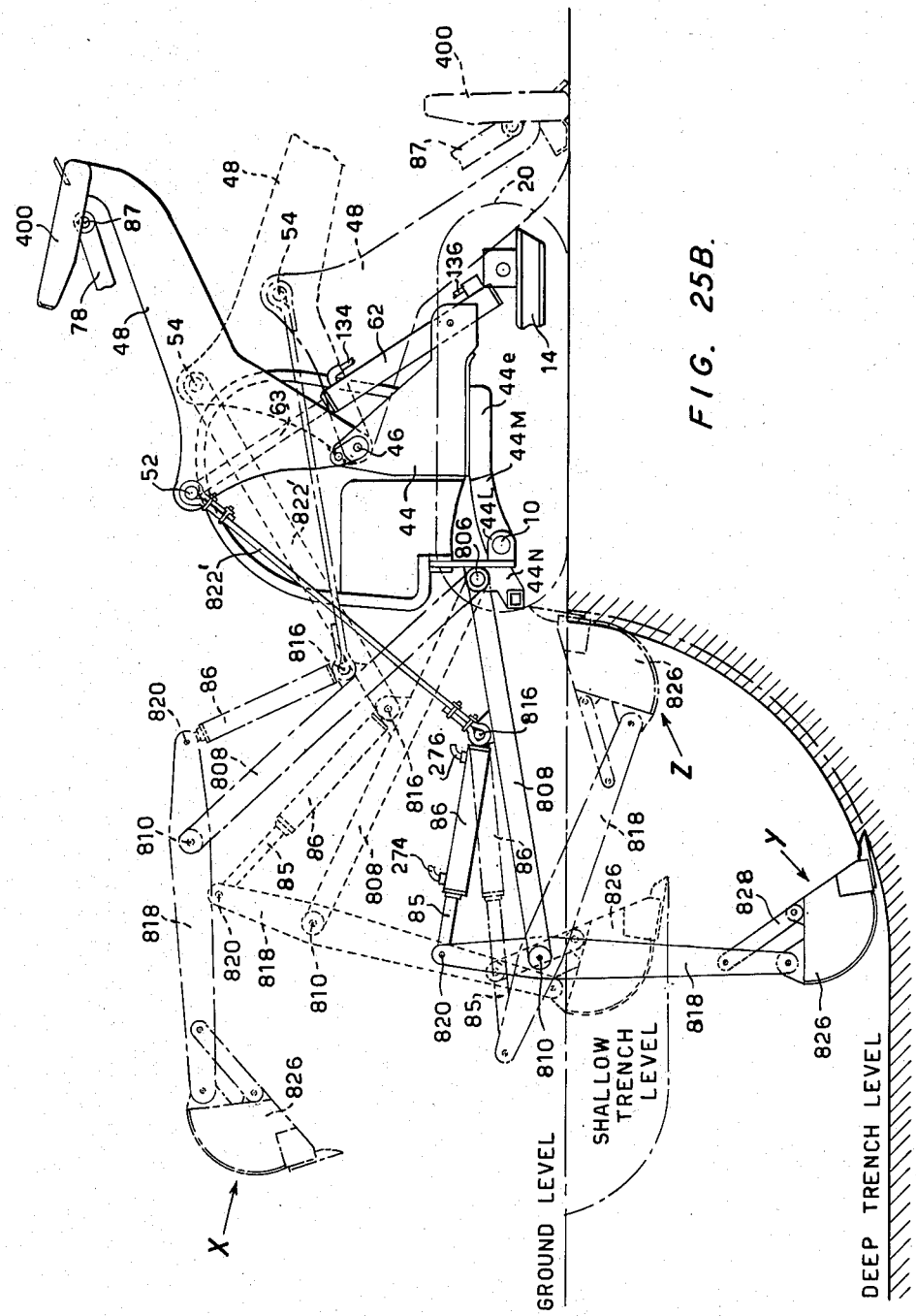

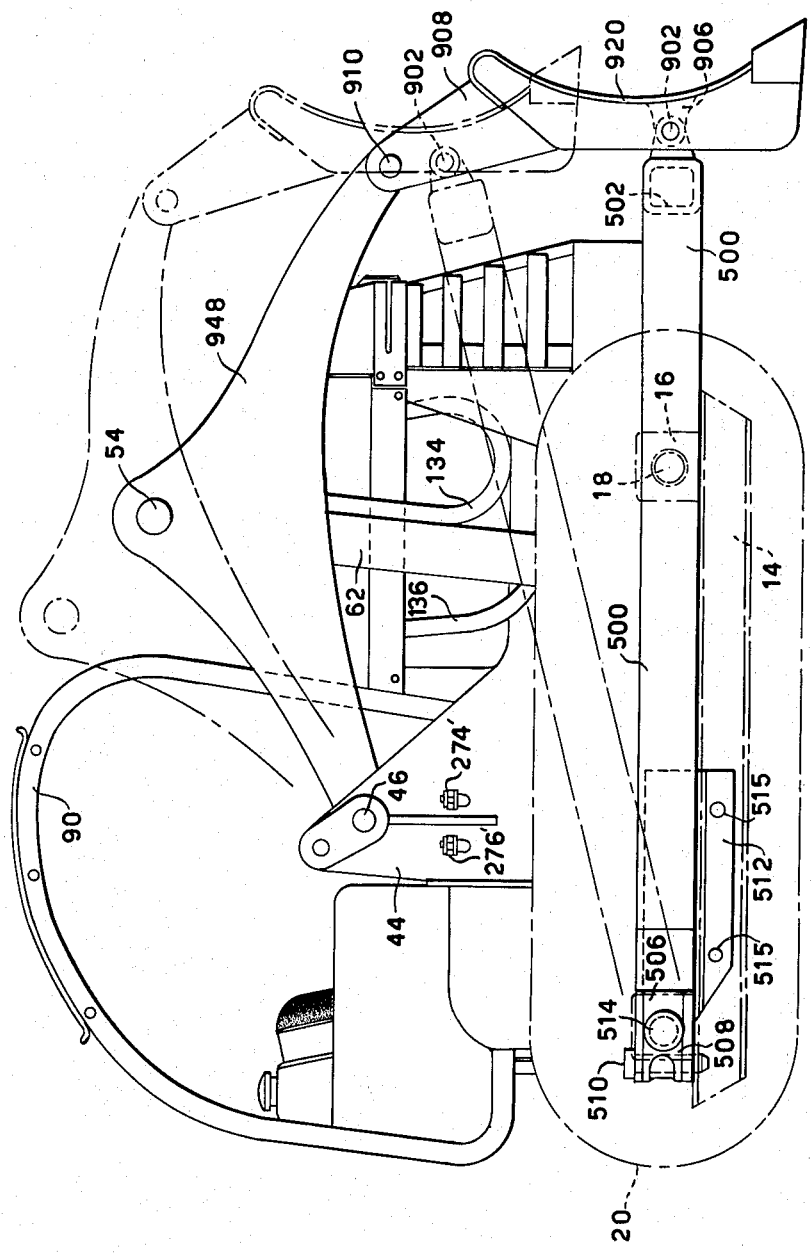

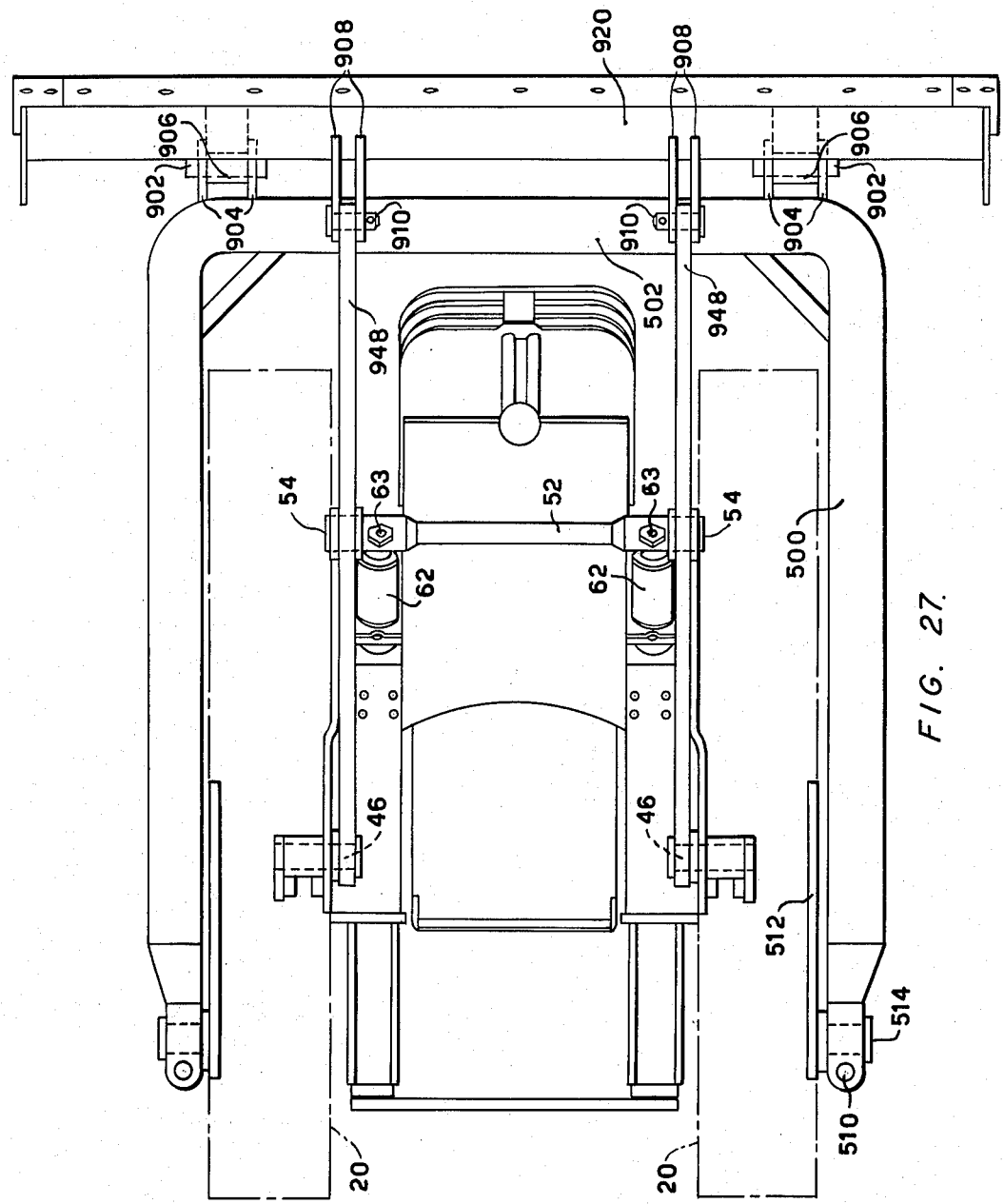

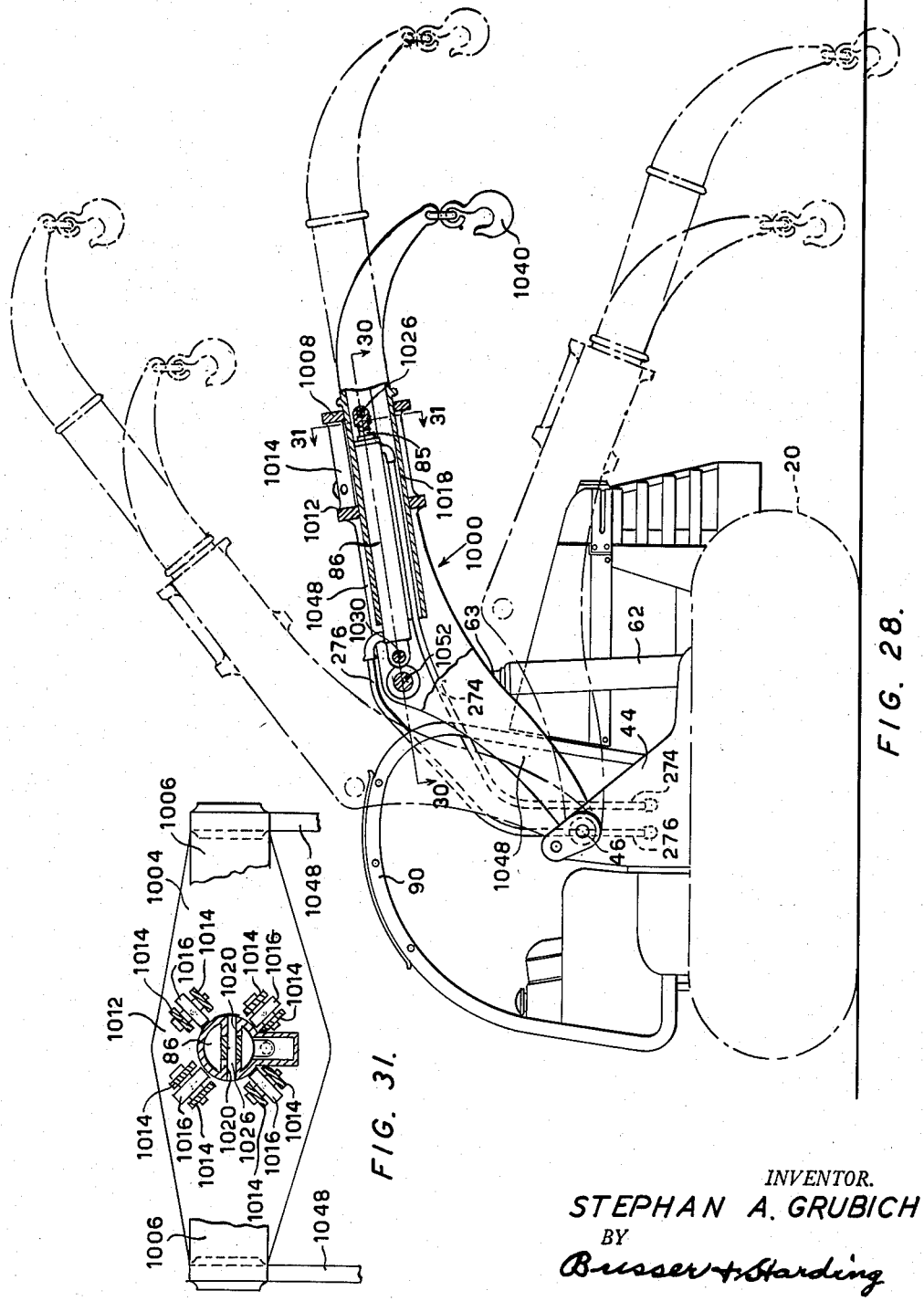

Jan. 31, 1956   S. A. GRUBICH   2,732,963
MATERIAL DIGGING AND HANDLING APPARATUS
Filed Jan. 9, 1951   34 Sheets-Sheet 25
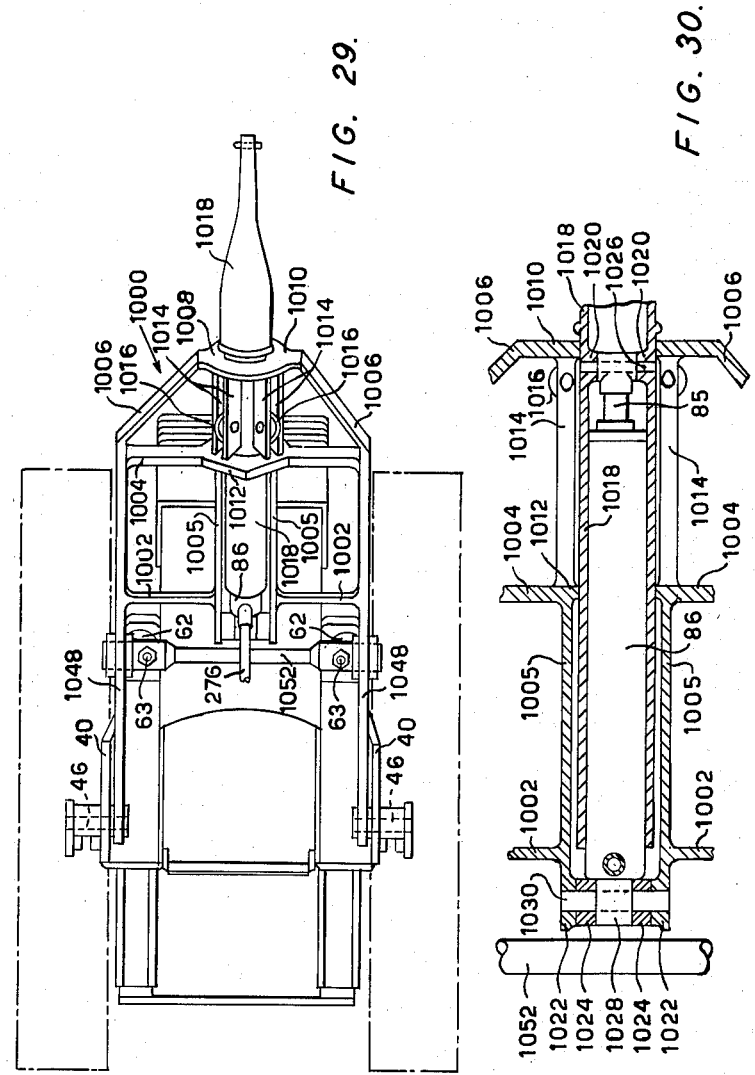
INVENTOR.
STEPHAN A. GRUBICH
BY
ATTORNEYS

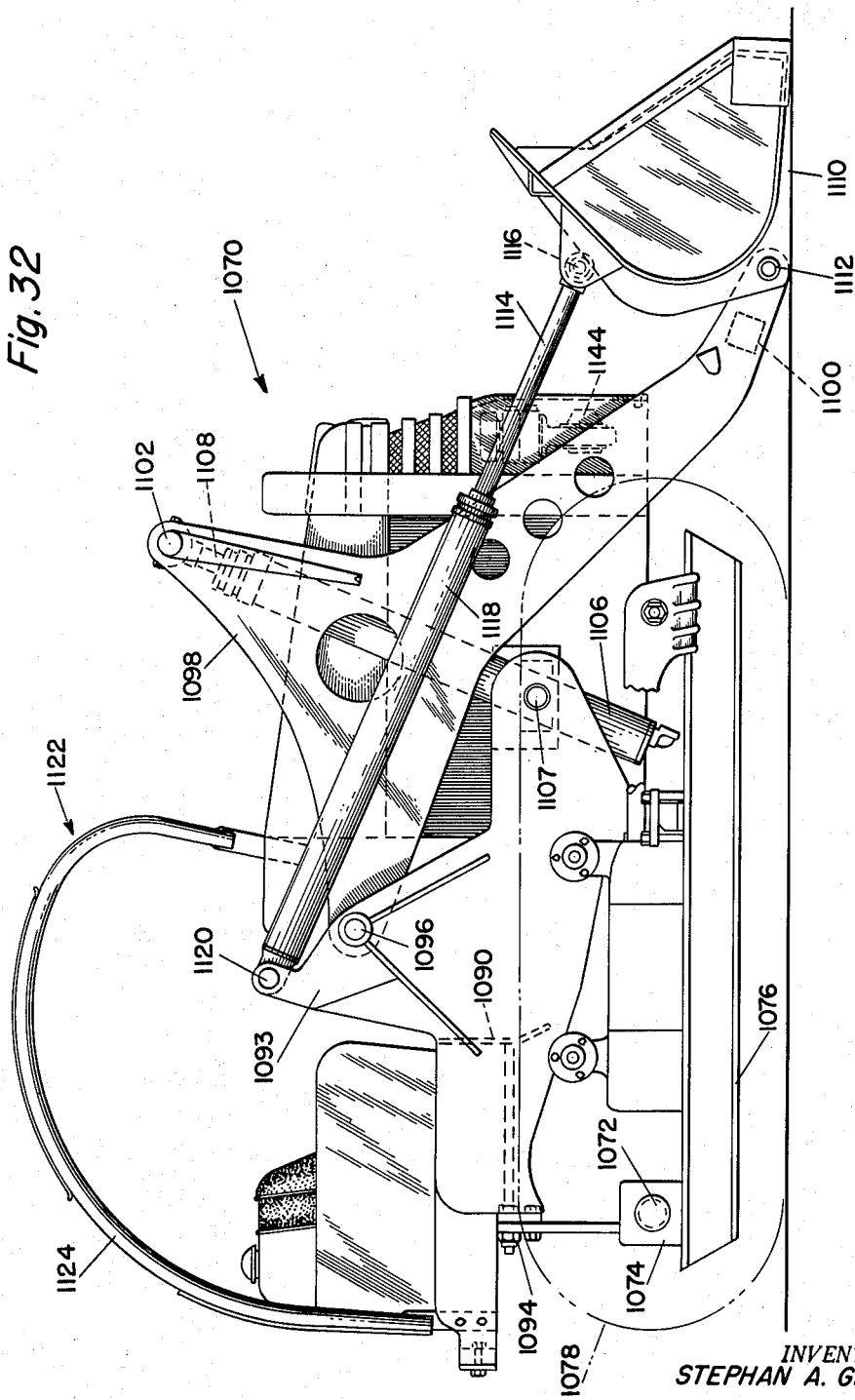

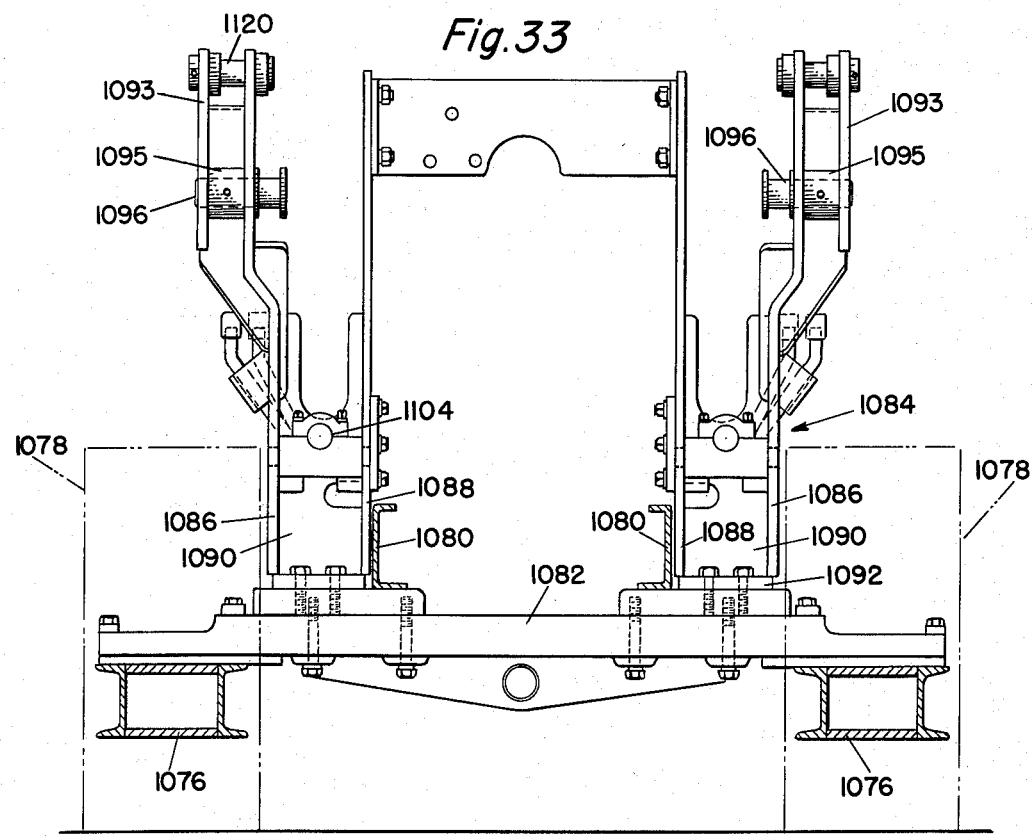
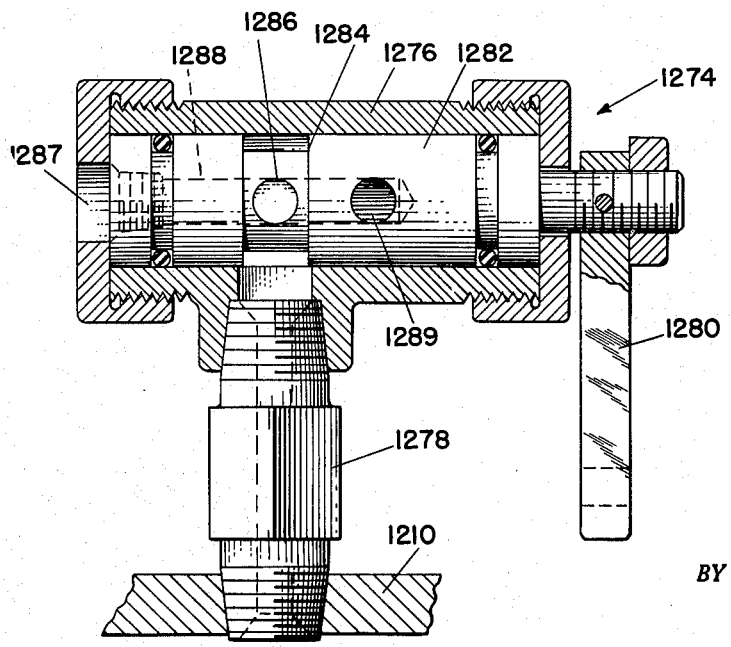

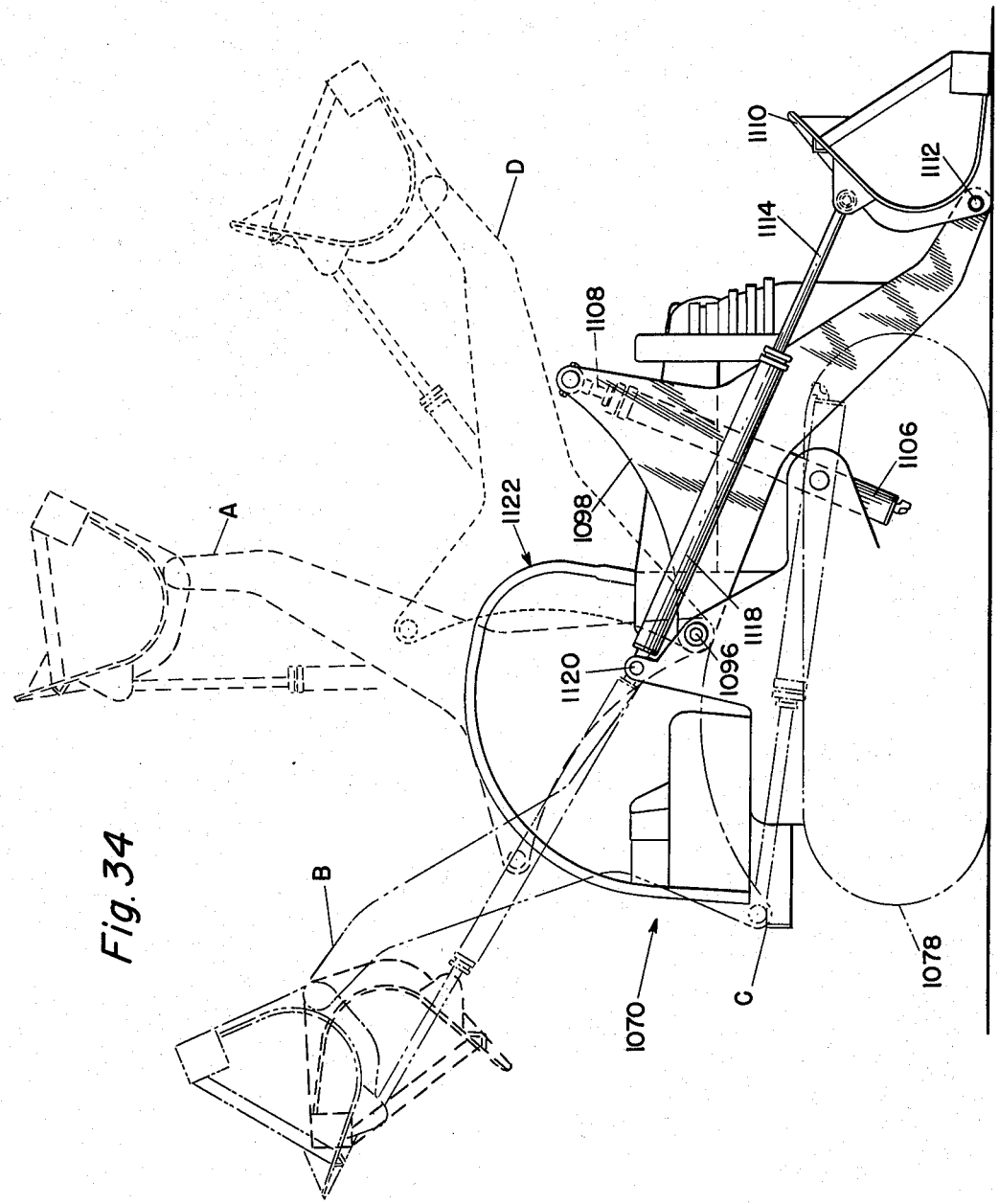

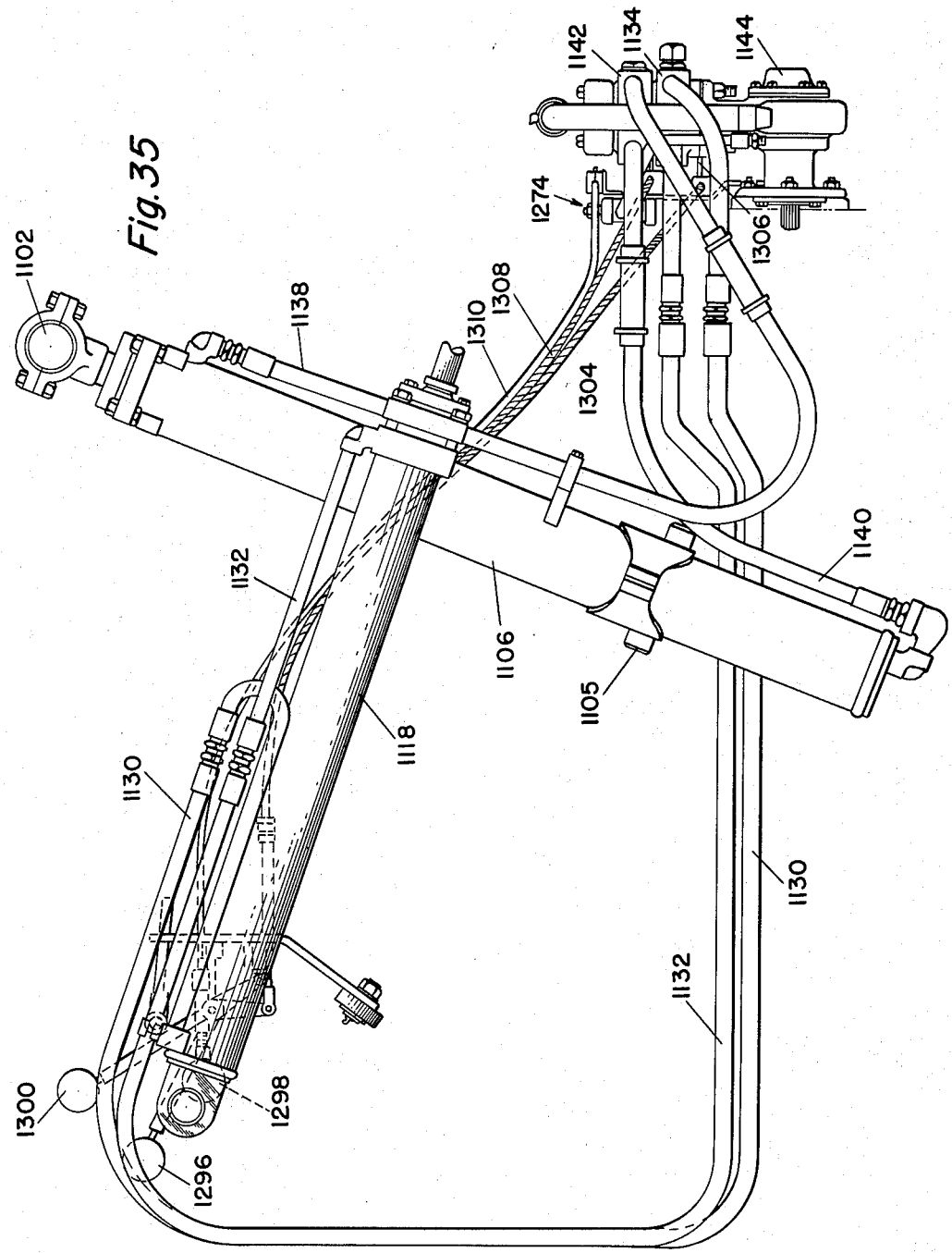

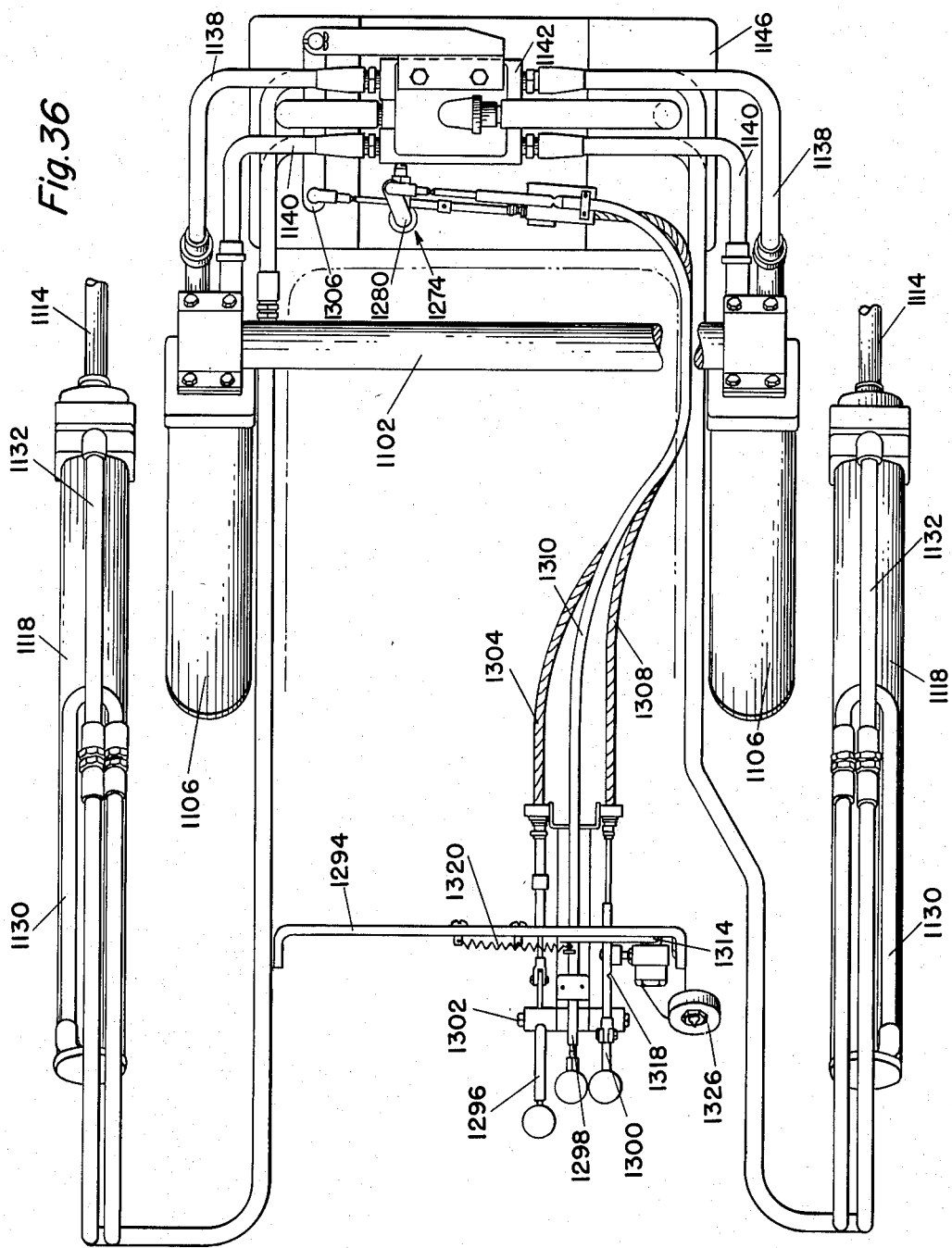

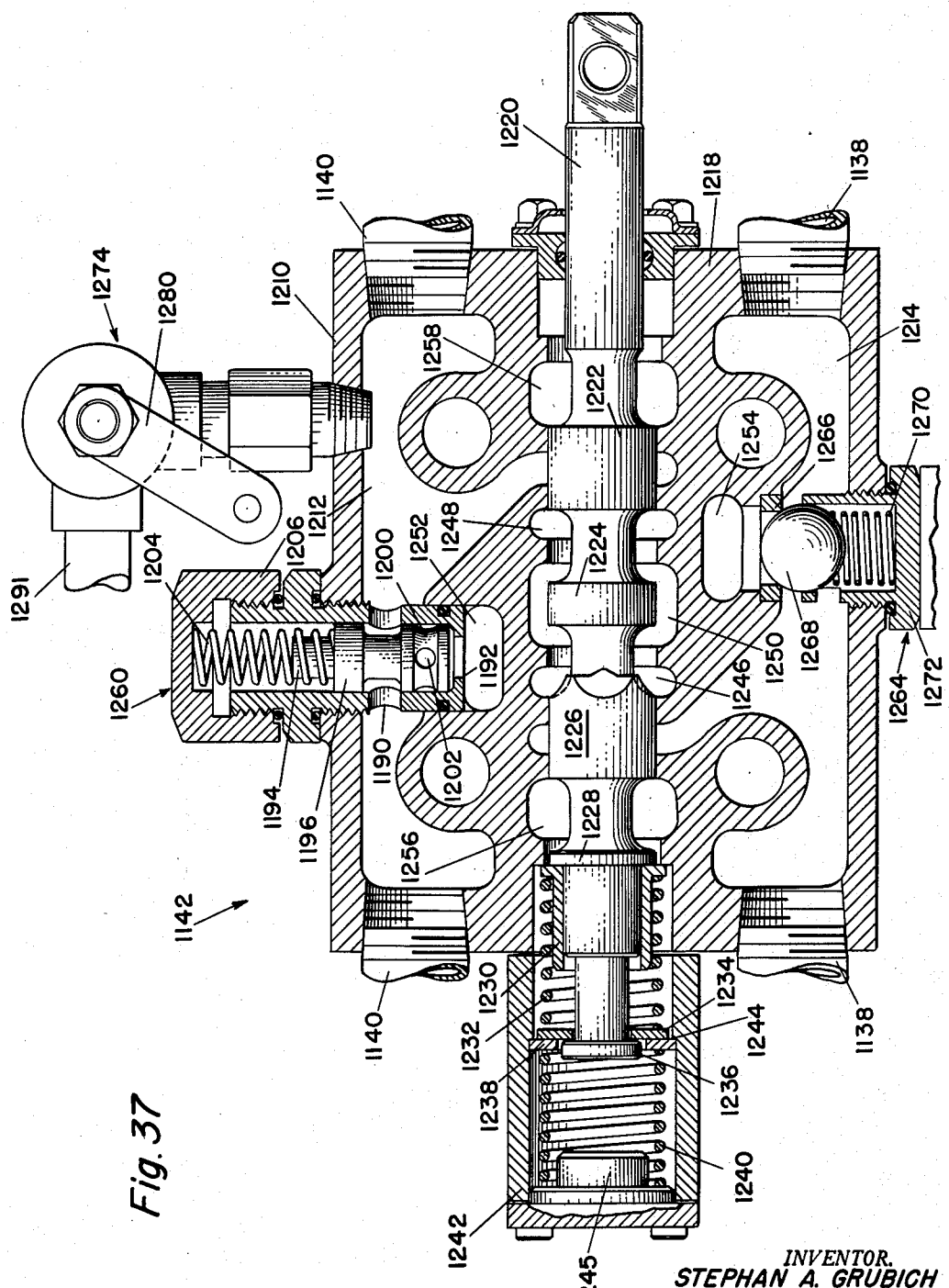

INVENTOR.
STEPHAN A. GRUBICH
BY Bassett Harding
ATTORNEYS

Jan. 31, 1956   S. A. GRUBICH   2,732,963
MATERIAL DIGGING AND HANDLING APPARATUS
Filed Jan. 9, 1951   34 Sheets-Sheet 33

INVENTOR.
STEPHAN A. GRUBICH
BY
ATTORNEYS

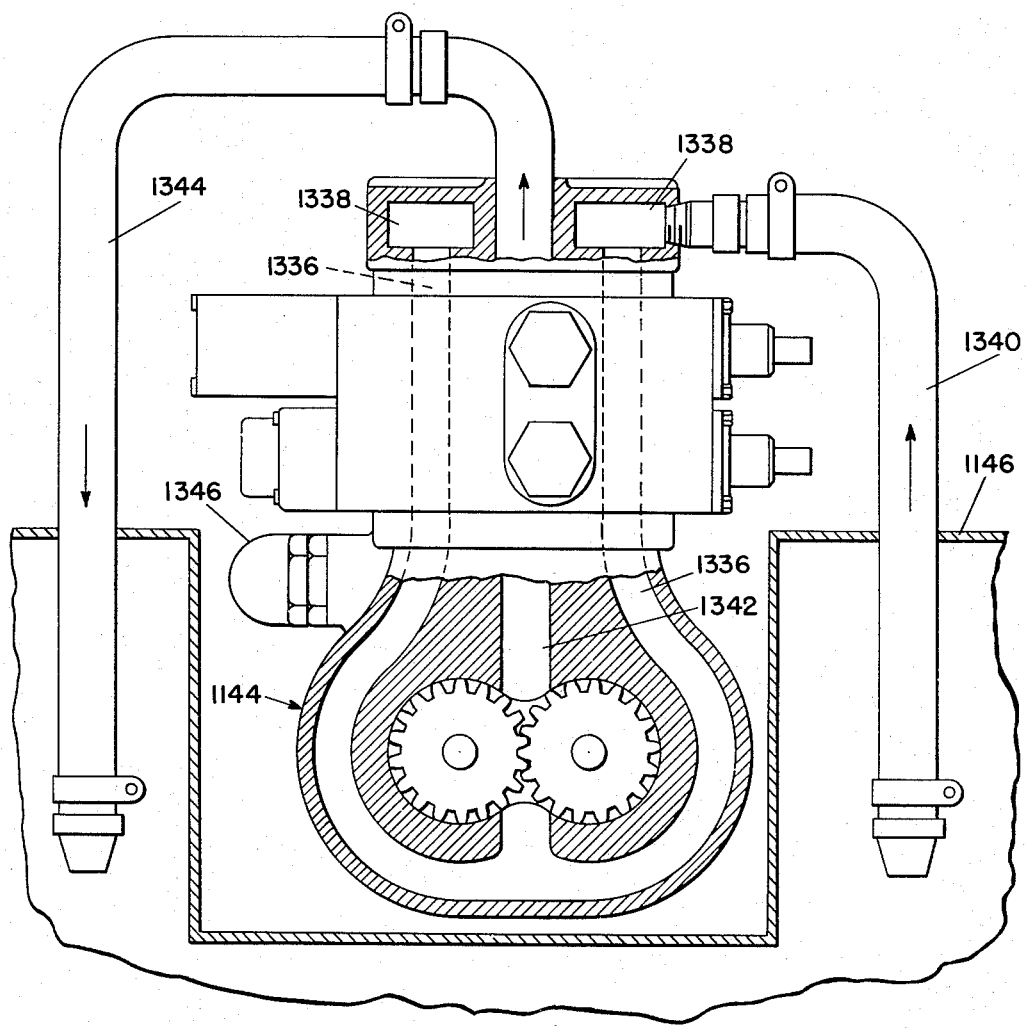

United States Patent Office 2,732,963
Patented Jan. 31, 1956

2,732,963

MATERIAL DIGGING AND HANDLING APPARATUS

Stephan A. Grubich, Lafayette Hill, Pa.

Application January 9, 1951, Serial No. 205,121

9 Claims. (Cl. 214—140)

This invention relates to material handling apparatus and, more particularly, to tractor driven apparatus for digging and dumping the digging shovel, the various shovel actuating members being supported from a frame connected to the frame of the tractor and the shovel actuating members also being adapted for manipulating the movable members of other material handling devices positioned in place of the shovel.

One of the objects of my invention is the provision of means whereby the digging, handling and dumping means are mounted on a tractor of the Caterpillar type having the usual power-driven traction chains, each having a supporting frame as well as a frame for the engine for driving the tractor on which the frame for supporting the digging and dumping mechanism is supported, the interconnecting means at the rear of the engine frame and the tractor chain frames being through the driving axles between the engine and the tractor chain driving sprocket wheels, the forward ends of the tractor chain frames and the forward portion of the engine frame being connected to each other by a walking beam pivotally connected to the central portion of the engine frame, each end of the walking beam resting on a slipper block on the frame of one of the tractor chain frames so that the leading ends of the tractor chain frames may move up or down relative to each other and the engine frame while moving over uneven ground without materially inclining the engine frame from a substantially horizontal position whereby a large portion of the strains transmitted to the engine frame by opposite up and down movements of the forward ends of the tractor chain frames is eliminated.

Another object of my invention is the provision of pivoted supporting and lifting arms or frame connected to each side of the implement to be raised and lowered in front or in back of the tractor, together with hydraulic rams for raising and lowering the arms and hydraulic rams having actuating means between the rams and the implement to oscillate the implement carried by the arms.

Another object of my invention is the provision of a double acting hydraulic ram pivotally mounted on the supporting frame at each side.

Another object of my invention is the provision of a double acting hydraulic ram at each side of the apparatus for raising and lowering the lifting arms as well as a demountable ram at each side of the apparatus for shifting the implement carried by the arms.

Another object of my invention is the provision of means for controlling the flow of liquid to the opposite ends of the ram cylinders, and, by interconnecting the same ends of each pair of cylinders to a common source of liquid supply, each cylinder of a pair of rams will be subjected to the same pressure thus avoiding any danger of a twisting force being applied to the interconnecting means between the lifting arms or to the implement carried thereby.

Another object of my invention is the provision of a pump directly actuated by the engine of the tractor for circulating liquid in a hydraulic system for applying power for the various cylinders as desired while the engine is in operation.

Another object of my invention is the provision of means for filling a shovel, raising the loaded shovel to either forward, or rear dumping position, and dumping.

Another object of my invention is the provision of a hydraulic system for supplying hydraulic pressure for actuating the rams, as well as means for controlling the delivery of hydraulic pressure to the ram cylinders, which includes the pump driven by the tractor engine, a tank, a connection from the tank to the inlet side of the pump, a valve casing having an inlet chamber connected to the outlet side of the pump, connections leading from the valve casing to opposite ends of each pair of cylinders, an outlet chamber, and a connection from the outlet chamber to the tank. The valve chamber is provided with a valve and ports for connecting one end of the cylinders of the lifting rams with the inlet chamber, while the other ends are connected to the outlet chamber, or for preventing the flow of liquid to or from the cylinders. A similar valve and ports are provided for the flow to and from the cylinders of the other set of cylinders.

Another object of my invention is the provision of a by-pass under a predetermined pressure through which the liquid flows when both valves are in their closed or neutral positions.

Another object of my invention is the provision of means for maintaining a shovel, when used as an implement, in a substantially upright position during its movement from its digging position to either a forward or rearward dumping position, to prevent the spilling of a portion of the load.

Another object of my invention is the provision of a bulldozer head or scraper, which can readily be connected to the shovel actuating mechanism, whereby the scraper is maintained parallel with the axle of the tractor, and which can be raised and lowered by the lifting arms and rocked about the pivotal connections to the lifting arms, to vary the angle of the head about the pivotal connection to the arms as well as change the inclination of the head.

Another object of my invention is the provision of a lifting fork adapted to be connected to the lifting arms and whereby the horizontal load supporting members may be positioned on the ground, or elevated to the desired height, for the reception of a load to be positioned on the horizontal members, then transferred to the points of delivery, and dumped by the means for oscillating the implement.

Another object of my invention is the provision of an A frame, for a bulldozer head, the rear end thereof being readily attached to, or in line with, the ends of the tractor axles, while the forward end of the A frame is supported by the implement lifting arms after the implement previously used has been disconnected therefrom, the A frame being provided with means whereby the bulldozer head is pivotally connected thereto for permitting the head to be positioned parallel with the tractor axle, or at an angle thereto, and retained in its angular positions by pins connecting end braces extending from the ends of the head to the A frame, which pins are removed and replaced by hand.

Another object of my invention is the provision of an A frame for supporting a bulldozer head such as above described, whereby the annular position of the head may be changed by the hydraulic means for tilting the head, thus permitting the operator to change the angle of the head without leaving the cab.

A still further object of my invention is the provision of means whereby crane mechanism can be readily connected to the framing on the tractor, for supporting means for converting the device into a tractor crane, by using the lifting rams for raising and lowering the crane boom and using one of the rams for oscillating the implement for lengthening and shortening the boom, to the end of which the usual crane hook is attached.

A still further object of my invention is the provision of means whereby a digger having a shovel and actuating mechanism, arranged to be assembled with the tractor and the shovel actuating members, whereby a shovel, or digger, may be attached to the rear of the apparatus and moved in an arc of a circle for digging.

Having now described the nature and purpose of this invention, I will proceed, for illustrative purposes, to a detailed description of embodiments thereof, with reference to the accompanying drawings, in which:

Fig. 4 is a diagram showing the shovel shifted into various positions, during the digging and shifting to forward and rear dumping positions;

Fig. 4A is a side elevation of a modified form of shovel;

Fig. 5 is a side elevation diagrammatically illustrating the various connections from the liquid tank and valve casing to the several cylinders and the valve actuating mechanism;

Fig. 6 is a plan view diagrammatically illustrating the connections shown in Fig. 5;

Fig. 7 is a rear view of the valve casing and the valve actuating connections, in which the automatic valve shifting mechanism is shown for shifting the valve for the lifting rams to its neutral position;

Figs. 11, 12, 13, 14 and 15 are diagrams showing the valves in the different flow control positions;

Fig. 16 is a side elevation of a straight bulldozer coupled to the lifting arms and the arms for rocking the implement on the pivotal connections with the lifting arms;

Fig. 24 is a side elevation of a portion of a digger mechanism for digging from the rear of the tractor;

Fig. 24A is a side elevation of the remaining portion of the mechanism shown in Fig. 24;

Fig. 25 is a plan view of the mechanism shown in Fig. 24, with the parts shown in full lines which are shown in dotted lines in Fig. 24;

Fig. 25A is a plan view of Fig. 24, showing the parts in full lines which are shown in dotted lines in Fig. 24A.

Fig. 25B is a diagram illustrating the movements of the members during the scooping of material and dumping thereof;

Fig. 26 is a side elevation of a simple form of bulldozer such as shown in Figs. 20 and 21;

Fig. 27 is a plan view of Fig. 26;

Fig. 28 is a side elevation of a crane mechanism carried by the lifting arms;

Fig. 29 is a plan view of Fig. 28;

Fig. 30 is a detail sectional view on the line 30—30 of Fig. 28 on a larger scale; and Fig. 31 is a detail sectional view on the line 31—31 of Fig. 28.

Fig. 32 is a side elevation of a modified digger in accordance with this invention.

Fig. 33 is a detail sectional view of the digger of Fig. 32 looking rearwardly and showing the framing which supports the shovel structure.

Fig. 34 is a diagram showing the digger of Fig. 32 in various positions.

Fig. 35 is a side elevation showing diagrammatically the connection between the cylinders of Fig. 32 and the control valves.

Fig. 36 is a plan view showing diagrammatically the connection between the cylinders of Fig. 32 and the control valves.

Fig. 37 is a sectional view of the lift arms control valve.

Fig. 40 is a vertical sectional view of the flow control valve.

Fig. 43 is an elevation partially in section of the pump, its associated manifold and the pump intake and discharge lines.

Mounted on the axles between the bearings and between the channel members in the usual manner is the usual driving sprocket or track wheel not shown. Mounted on the front end of each of the channel members 14 of the track frame at each side of the tractor is a bearing such as shown diagrammatically at 16, in which an axle 18 is journalled, and mounted on the axle is an idle sprocket or track wheel not shown.

Figure 1:
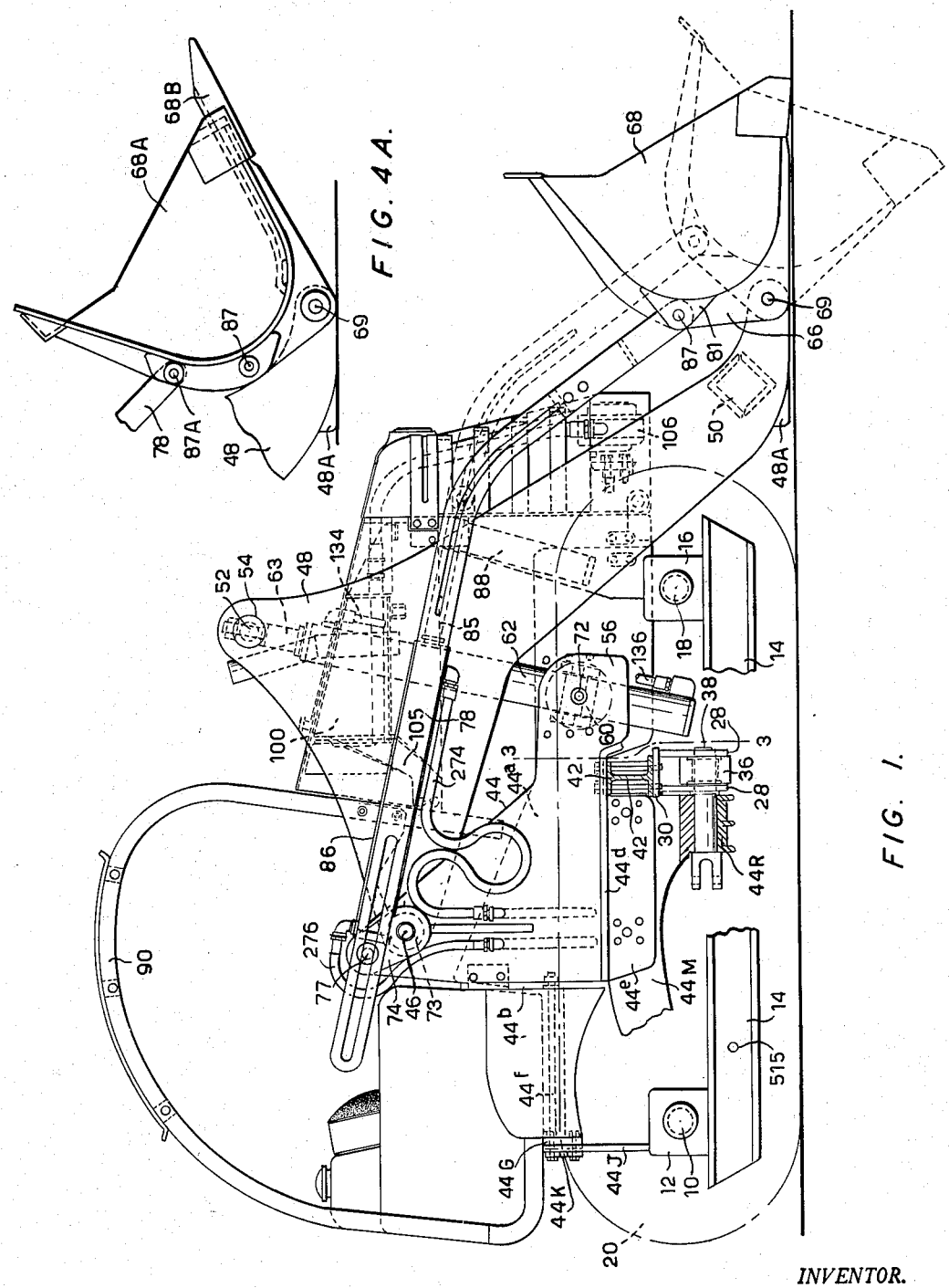
Fig. 1 is a side elevation of a tractor on which is mounted the mechanism for controlling my improved shovel, without the track or its driving sprocket wheels, with a portion of the track frame broken away.
Figure 2:
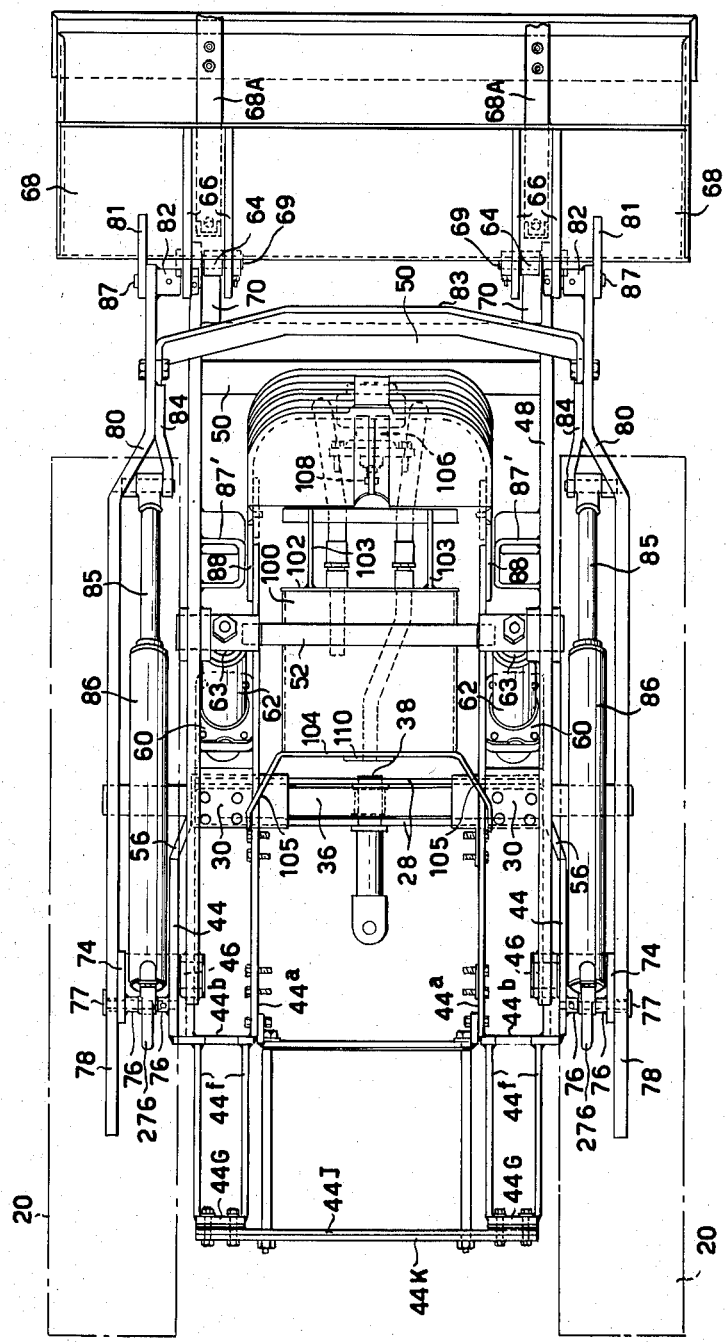
Fig. 2 is a plan view of the shovel supporting and actuating mechanism shown in Fig. 1.

Mounted on the track or sprocket wheels at each side of the tractor is a track of the usual type shown in outline at 20 in Figs. 1 and 2.

The track frame channel members 14 are connected to each other by an intermediate plate 22, the ends thereof being connected to each other in the usual manner by the axles and bearings, or by additional transverse members if required.

Figure 3:
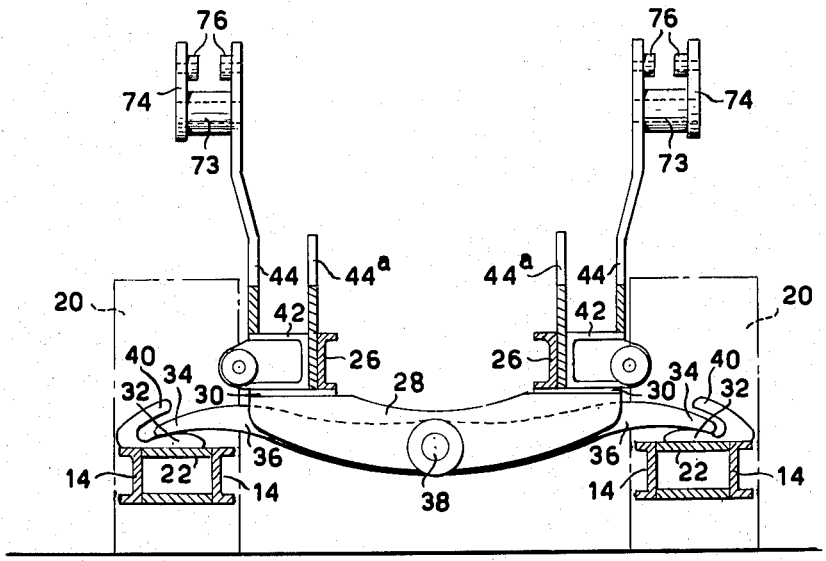
Fig. 3 is a detail sectional view of the framing, on the line 3—3 of Fig. 1.

The engine supporting frame of the tractor is also formed of two channel members 26, connected to each other by an equalizing saddle formed of spaced members 28, which are connected to each other by plates 30 at the ends thereof, the plates being connected to the under faces of the flanges of the engine frame channel members 26, see Fig. 3.

Mounted on each of the plates 22 of the track frame is a slipper pad 32 and engaging each slipper pad is one end 34 of an equalizing lever 36. The equalizing lever is pivoted at 38 between the members 28 of the equalizing saddle, so that when the track frames move relative to each other about the axis of the rear axle, the equalizing lever will be rocked about its pivot 38 and minimize the motion transmitted from the track frames to the engine frame.

Secured to each slipper pad 32 is a guard member 40 which extends over the end 34 of the equalizing lever 36.

Extending laterally from each of the channel members 26 of the engine frame and connected thereto as well as to one of the plates 30 of the equalizing saddle is a support 42 for a track frame guide roller, not shown, for guiding the forward ends of the track frames during their oscillating movement about the axis of the rear axle, and also to maintain the axles of the front track sprocket wheels and frames 14 in parallel relation to each other and normal to the driving axles.

The engine frame channel members 26 are connected to each other by other means, not shown, than by the equalizing saddle.

Mounted on the engine frame at each side thereof is a side frame, having an outer member 44 and an inner member 44ª, connected to each other by an end member 44ᵇ, a bottom plate 44ᵈ having a downwardly extending member 44ᵉ which is connected to the web of the channel section 26 of the engine frame at that side from which all of the various members for moving the raising and lowering arms are supported, as well as the means for tilting the shovel during digging, as well as for tilting the shovel.

Pivotally mounted on a pin 46 to each outside member 44 of the side frame is a bucket supporting and raising arm 48, the forward ends of which are connected to each other by a hollow cross bar 50, while the intermediate portions are connected to each other by a bar 52, mounted at its ends in the shovel arms for rotation at 54.

The end of each member 44 of the side frame extends inwardly at 56 under the bucket lifting arm and then parallel with the bucket arm. The entire length of the inner side frame member 44ª is parallel with the bucket arm 48.

Pivotally mounted between the end 56 of the outer frame member 44 and the end of the inner member 44ª of the side frame is a trunnion bracket 60 for supporting a cylinder 62 of a hydraulic ram 63 for raising and lowering the bucket arms 48, which is clearly shown in Figs. 1 and 2.

Extending diametrically opposite from the trunnion bracket 60 are trunnions 72 which are pivotally mounted in the end 56 of the side frame member 44 and the end of side frame member 44ª, see Fig. 1.

The end of each raising arm 48 is provided with a boss 64, which is pivotally connected between reinforcing straps 66 on the shovel 68, by a pin 69, through which power for digging by the movement of the tractor and the lifting rams for raising the shovel to dumping position is applied.

Each boss 64 is braced by a member 70, connected to the inner face of the arm 48.

Extending outwardly from each outer frame member 44 is a boss 73 for the pivot pin 46 and extending upwardly at an angle to the vertical from the outer face of each boss is an arm 74, and 76 are bosses extending towards each other from the frame member 44 and the arm 74 for a pin 77, having a head on the outer end thereof spaced from the outer face of the arm 74.

Mounted on pin 77 between its head and the arm 74 is a roller, shown in dotted lines in Fig. 1, on which a slotted manipulating arm or member 78 is mounted for reciprocation, as hereinafter described.

With particular reference to Fig. 2, it will be noted that these arms 78 extend forwardly, and at 80 are bent toward each other, then parallel to each other, the end of each being provided with a boss 82, which is pivotally mounted on a pin 87 between one of the bucket reinforcing straps 66 on the shovel and a bracket 81 extending from the shovel 68.

The arms 78 are connected to each other, adjacent to the connections to the shovel, by a cross bar 83.

A bent bar 84 is connected to each arm 78 and extends rearwardly from adjacent to the cross bar 83 towards the bent portion 80, the bent portion 80 of each arm 78 and bent portion of the bar 84 form between them a fork, in which the end of a ram 85 is pivotally mounted.

The ram extends from a hydraulic cylinder 86, the end of which is rockably mounted between bosses 76 on pin 77.

The cylinders 86 and rams 85 are arranged for tilting the shovel as hereinafter described.

The inner face of each shovel lifting arm 48 is provided with a loop-like member 87', which bears against a rubbing plate 88 on the inner frame member 44ª when the shovel is digging to take up twisting stresses between the lifting arms 48.

The cab of the tractor is provided with side frame members 90 of arcuate shape, struck from the center of the pivot pins 46 for the shovel lifting arms 48, the arc being of a radius to permit the cross-bar 52 to clear the cab cover connected to the frame member 90.

Extending rearwardly from end members 44ᵇ below the cab are bars 44ᶠ, connected at their outer ends by transverse members 44G, and clamped between these transverse members are a clamping member 44K and extending from one member 44G to the other is a plate 44J, which is connected at its lower end to bearings 44L for the rear axles, shown in Figs. 24 and 25, these bearings being connected to the extensions 44M extending downwardly from the engine supporting channels 26, in the usual manner, as the major portion of the tractor frame has been omitted from Figs. 1 and 2, in order to illustrate the framing for supporting the shovel supporting mechanism, portions thereof are shown in Figs. 24 and 25.

Connected to the plate 44J and each of the bearings 44L is a bracket 44N for supporting the usual draw-bar support 44P for the usual draw bar 44Q, extending from a bearing 44R supported from the engine frame.

The brackets 44N are each provided with a bearing 44S for supporting booms for actuating a digger, hereinafter described.

In Figs. 5 and 6 are illustrated diagrammatically the various pipe connections between the cylinders of the rams, valve casing and liquid tank, which will now be described.

The reference 100 designates a tank, the front plate 102 thereof being supported from the chassis by members, not shown, while the rear plate 104 is supported, by arms 105 extending laterally therefrom, to a support, not shown, to which the side frame members 90 of the cab frame are connected. A liquid circulating pump 106 is mounted on the forward portion of the chassis and is provided with a pinion 108, which is in continuous driving connection with the engine, not shown.

Welded to the rear plate 104 of the tank 100 is a plate 110, to which a valve casing 112 is secured by bolts 113 and 114, the bolts 114 extending through holes, 114' through the body of the valve casing into the plate 110, into which they are threaded, the plate 110 forming the back cover of the valve casing 112. The bolts 113 extend through a front cover plate 116 for the valve casing, holes 113' through the valve casing 112, and are threaded into the plate 110, see Figs. 7 and 8.

Figures 8, 9:
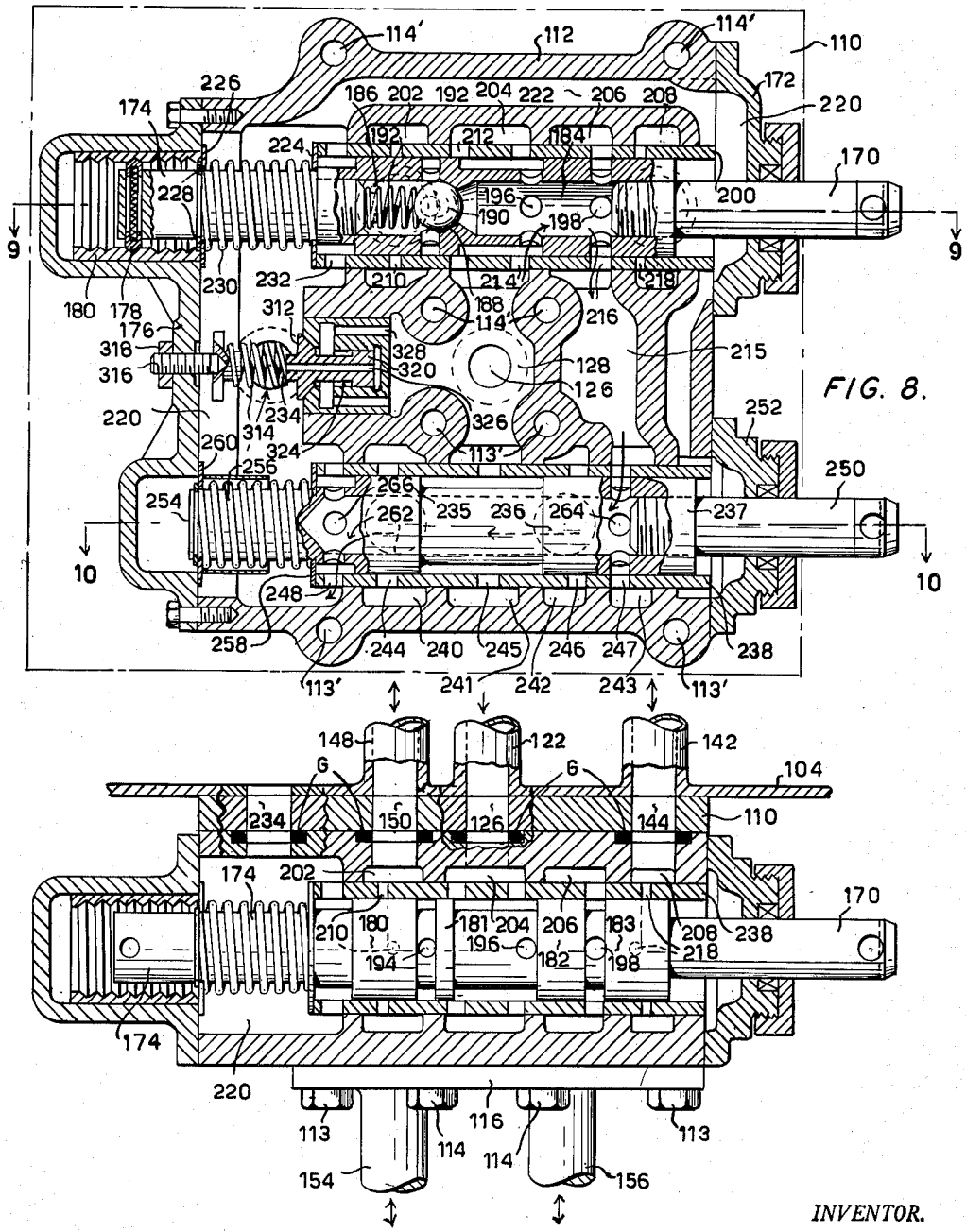
Fig. 8 is a vertical section through the valve casing showing the valves for controlling the flow to and from the liquid reservoir to the lifting ram cylinders and the shovel manipulating rams.
Fig. 9 is a transverse section on line 9—9 of Fig. 8, showing the valve for the lifting rams in their neutral or central position.

Extending from a nipple 118 welded to the front plate 112 of tank 100 is a pipe 120 connected to the inlet side of pump 106, and extending from the outlet side of the pump to one end of a pipe 122, extending through the front plate 102 of the tank, is a pipe 124, the pipe 122 extending through the tank and being welded around an inlet port through the rear plate 104 of the tank, see Fig. 9, which communicates with an inlet port 126 communicating with a high pressure chamber 128 in the valve casing 112.

Extending transversely through the tank 100 adjacent to the front plate 102 is a pipe 130, which is welded to both side plates and extends therethrough forming nipples 132, to each of which a pipe 134 is connected, each being connected to the outer or upper end of the ram cylinder 62 at that side of the apparatus.

The lower end of each cylinder 62 is connected, by means of a pipe 136, to a nipple 138 at the end of a second pipe 140 extending transversely through the tank adjacent the rear plate 104.

Connected at one end to pipe 130 within the tank is a pipe 142, the other end thereof being welded about an opening in the rear plate 104 of the tank, which is in communication with a port 144 through the valve casing and which in turn is in communication with a chamber 208 in the valve casing, whereby liquid is delivered to and withdrawn from the upper ends of cylinders 62.

It might here be stated that each of the ports through the plate 110, connected to the tank 100, as well as the ports through the front cover plate 116 for the valve casing 112, communicates with a port in the valve casing. Each port in the valve casing is provided with a surrounding annular recess in the face of the valve casing, in which an annular gasket of cylindrical cross-section is seated, which is compressed between the face of the recess and the face of the adjacent plate, to form a tight joint between communicating ports when the cover plate 116 and the valve casing 112 are secured to the plate 110.

The pipe 140 is also in connection with the valve casing 112 by means of a pipe 148 welded about an opening in rear plate 104, which is in communication with a port 150 through the valve casing 112, which in turn communicates with a channel 202 in the valve casing, whereby liquid is delivered to and withdrawn from the lower ends of cylinders 62, see Fig. 9.

The front cover plate 116 is provided with two nipples 154 and 156 which communicate with ports 158 and 160, respectively, in the valve casing 112. Port 158 in turn, communicates with chamber 240, while port 160 communicates with chamber 242 in the valve casing, see Fig. 10.

A relief valve 166 is placed in at least one of the pipes 136 leading from the lower end of a cylinder 62, which is provided with an outlet pipe 168 leading back to the tank. The valve casing 112 is provided, in the upper portion thereof, with a valve for controlling the flow of liquid to and from cylinders 62 for the lifting rams and is provided with a plurality of spools between an actuating stem 170 at one end extending through a packed opening in the end cover plate 172 and a stem 174 at the other end located in a cylindrical chamber in an end cover plate 176. Located in the end portion of stem 174 are a pair of spring actuated detents 178, which are arranged to seat in V-shaped annular grooves in the inner face of a sleeve 180 in the cylindrical chamber in cover plate 176, for positioning the valve in any one of six different positions. The valve is provided with spools 180, 181, 182 and 183 between stems 170 and 174, see Fig. 9, and is provided with a chamber 184 therein at the end of stem 170, which is separated from a similar chamber 186 by a valve seat 188 at the other end of the valve. Seated against said seat 188 is a ball 190 by means of a spring 192, which closes communication between the chambers when seated against the seat.

Connecting the annular space between spools 180 and 181 with chamber 186 within the valve are a plurality of ports 194. Connecting the space between spools 181 and 182 with chamber 184 are a plurality of ports 196, and 198 are similar ports also connecting the space between spools 182 and 183 with chamber 184.

The lifting ram valves are mounted for reciprocation in tubular member 200, in a bore through five ribs within the valve casing forming four channels 202, 204, 206 and 208, surrounding the tubular member. Connecting channel 202 with the interior of tubular member 200 are ports 210, connecting channel 204 with the interior of tubular member 200 are two sets of ports 212 and 214 spaced from each other, connecting channel 206 with the interior of the tubular member are ports 216, and connecting channel 208 with the interior of the tubular member are ports 218.

Both ends of the tubular member 200 open into a low pressure chamber 220 at both ends of the casing 112, which are connected by means of a channel 222 at the top of the casing, so that the liquid pressure on opposite ends of the valve are equal at all times, regardless of the position of the valve Surrounding the valve stem 174 are washers 224 and 226. The washer 224 abuts a shoulder on the valve stem 174 when the valve is moved to the left, while the washer 226 abuts a split ring 228 seated in a groove in the valve stem 174 when the valve is moved to the right. Surrounding the valve stem between the washers 224 and 226 is an expansion spring 230 tending to spread the washers to maintain the valve in its neutral, or central position as shown in Fig. 8. In this position of the valve the washer 224 will engage the end of the tubular member 200, while the washer 226 will engage the inner wall of the end closure plate 176.

The end of the tubular member 200 extending into the low pressure chamber 220 is provided with a plurality of ports 232, opening into the low pressure chamber, to permit free flow of liquid between the low pressure chamber 220 and the space between the washer 224 and the end of the tubular member 200, during the movement of the valve when the washer 224 is seated against the end of the tubular member 200.

The liquid returning from the low pressure chamber 220 to the tank 100 passes through a port 234, through the rear wall of the valve casing and the plate 104 of the tank, which is clearly shown in cross section in Fig. 9, in which the rear wall of the valve chamber, as well as the plate 104 of the tank 100, is in a plane below the plane of ports 144 and 150. The port 126 and pipe 122 for delivering the liquid to the pressure chamber 128 are similarly shown in Fig. 9.

The valve casing 112 is also provided with a spool valve in the lower portion thereof for controlling the flow of liquid from the high pressure chamber 128 to both ends of cylinders 86, as well as from both ends of the cylinders back to the low pressure chamber 220, to control the position of the shovel 68 pivotally supported from the ends of arms 48.

This valve is also provided with spools, designated 235, 236 and 237, which engage the inner surface of a tubular member 238, which is mounted in a bore through five ribs, forming four channels 240, 241, 242 and 243 between the ribs and extending into the low pressure chamber 220 at each end of the valve casing, as tubular member 200.

Channels 240, 241, 242 and 243 are in communication with the interior of the tubular member 238 by ports 244, 245, 246 and 247, respectively, the tubular member being also provided with a port 248 opening into the low pressure chamber for the same purpose as port 232 in tubular member 200.

The valve is provided with an actuating valve stem 250, which extends through a packing in a cover plate 252.

The other end of the valve is also provided with a stem 254 surrounded by a spring 256, between washers 258 and 260, for retaining the valve in its central position, in the same manner as the valve for controlling the fluid flow to the lift rams.

The valve is provided with a chamber 262 therein and, extending from the chamber to the interior of tubular member 238, are ports 264 and 266.

It it is desired to slowly raise the lifting arms, the valve stem 170 is shifted by the valve actuating mechanism, hereinafter described, to shift detents 178 into the groove to the left from that shown in Fig. 8, which will position the valve in the position shown in Fig. 11, so that the liquid will flow from the high pressure chamber 128, through ports 212 and 214 and through port 196, into chamber 184 in the valve, force the ball 190 from its seat 188 against the pressure of spring 192, and flow out through the half open ports 210 into channel 202 and out through pipe 148 to the bottom of cylinders 62, through pipes 138 and 136. The liquid from the top of the cylinders 62 will return to the tank 100, through pipes 134, 130, 142, to channel 208 in the valve casing and out through ports 218 through the tubular member 200 to the low pressure chamber 220 at the right hand side of the valve casing, then through channel 222 to the low pressure chamber 220 at the other end of the casing and then to tank 100 through port 234.

In the diagrammatic views shown in Figs. 11-15 the ports 210 and 218 have been shown double size for clearness, while in the actual structure there are two sets of ports side by side, as shown in Fig. 9, in which one set has been shown in full lines, and a second set in dotted lines, and a dotted line has been extended from one set to the other on spools 180 and 183.

When it is desired to increase the speed of the upward movement of the lifting rams, the valve is shifted to the left, to shift the detents 178 into the end groove, as shown in Fig. 8, in which ports 210 and 218 are fully open, while in the actual structure both sets of such ports would be open.

In order to slowly lower the lifting arms, the flow of liquid between the ends of cylinders 62 is reversed by shifting the valve to the right, to shift the detents 178 to the first groove to the right from that shown in Fig. 8, to the position shown in Fig. 14 to open one-half of ports 210 and 218, and when a fast movement is desired, the valve is shifted to fully open these ports as shown in Fig. 15.

As previously stated the pump is continuously driven by the tractor motor, so that the pump would be under a continuous load if the valves for controlling the flow of liquid to and from both sets of cylinders were in their neutral positions as shown in Fig. 8, in which position the rams are locked against movement. When the valves are positioned as shown in Fig. 8 the load on the pump is relieved from pressure chamber 128 through ports 214 and 196 to chamber 184 in the upper valve, from chamber 184 to the chamber 262 in the lower valve, through ports 198, 116, chamber 215, ports 264 and 247, and, from chamber 262 in the lower valve through ports 266 and 248 to the low pressure chamber 220 and back to the tank 100 through port 234. The load on the pump can also be relieved by shifting the upper valve to the position shown in Fig. 13, with the detent 178 in the right hand groove in sleeve 180, so the flow from the pressure chamber 128 through port 214 is directly to port 216, and then through the various connections above described to the tank 100.

In order to rock the shovel on its pivotal connections 87 with arms 78, liquid is delivered to the cylinders 86 from the high pressure chamber 128 in valve casing 112, and returned from the cylinders 86 to the low pressure chamber 220.

The shovel is rocked forward, as shown in dotted lines in Fig. 1, by connecting the pivoted ends of the cylinders 86 to the high pressure chamber 128 and connecting the other ends through which the rams extend to the low pressure chamber 220.

To control the flow of liquid to and from cylinders 86, valve stem 250 is moved to shift spool 235 to the opposite sides of port 244, and to shift spool 236 to opposite sides of port 246, as shown in Figs. 14 and 15.

Figure 10:
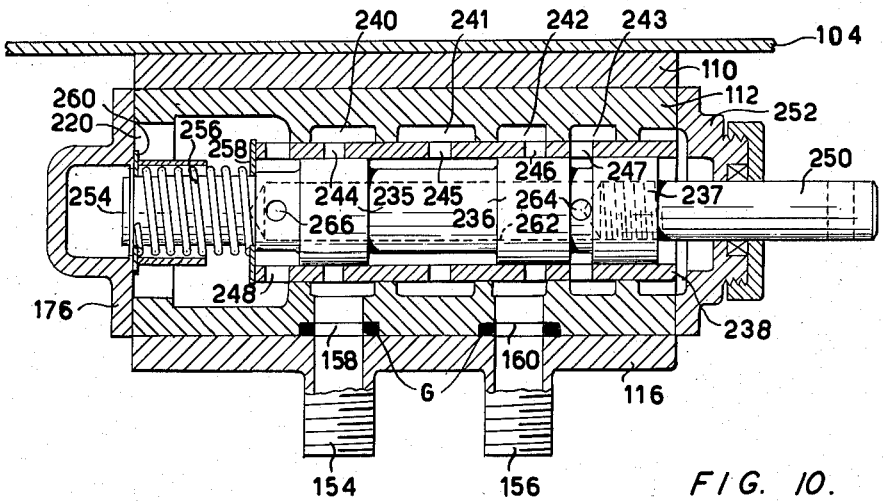
Fig. 10 is a similar view on line 10—10 of Fig. 8, showing the valve for the shovel manipulating rams partially in section.

Welded to the front plate 116 of the valve casing 112 are nipples 154 and 156, see Figs. 7 and 10, to which are connected pipes 270 and 272, respectively. The pipe 270 is connected to pipe 274, which in turn is connected to the ends of cylinders 86 through which the ends of rams 85 extend, while pipe 272 is connected to a pipe 276, which is connected to the closed ends or pivoted ends of the cylinders 86.

When the valve is shifted to position the spools as shown in Fig. 14, the liquid will flow from high pressure chamber 128 through ports 245 and 244 and pipes 270 and 274 to the ends of the cylinders 86, through which the rams 85 extend, to rock the bucket from the dotted line position to the full line position shown in Fig. 1, or to a position beyond that position, while the liquid from other ends of the cylinders will flow through pipes 276 and 272 to the low pressure chamber through port 246 in the valve casing, port 264 to chamber 262 within the valve, and out through port 266 into low pressure chamber 220, as shown in Fig. 14.

When it is desired to reverse the rocking of the shovel from the full line position, shown in Fig. 1, to the dotted line position, the valve is shifted to the position shown in Fig. 15, liquid is delivered from the high pressure chamber 128 through ports 245 and 246 to pipes 272 and 276 to the closed ends of cylinders 86, while the liquid from the ram ends of the cylinders will return through pipes 274 and 270 to the valve casing and to the low pressure chamber 220 through port 244, and ports 248.

The valve stem 170 for shifting the valve for cylinders 62 is connected to a bell-crank 278 by means of a link 280, bell-crank 278 is pivoted to a bracket 282 extending from the rear plate 104 of the tank 100. The bell-crank 278 is connected to a lever 284 by means of a link 286, the lever being pivoted to a block 288 extending upwardly from a side frame member 44ª, the pivoted end of lever 284 being provided with a forked end, and rotatably mounted in the forked end is a roller 290. Pivotally mounted at 291 on the outer face of the side frame member 44ª is a lever 292, having a toe 294 extending outwardly therefrom.

Pivotally mounted on the outer end of a second bracket 296 extending outwardly from the rear plate 104 of the tank is a bell-crank 298, one arm thereof engaging a toe 300 extending downwardly from bell-crank 278, and pivotally connected to the other arm of bell-crank 298 is an adjustable link 302, the other end thereof being pivotally connected at 304 to the lever 292.

The various connections just described are in their position when the valve for controlling the flow to and from the cylinders 62 of the lifting rams is in its central position, as shown in Fig. 8.

It will be noted from Figs. 6 and 7 that the face of roller 290 is in the plane of one of the cylinders 62 when the valve for controlling the flow of liquid to and from the cylinders 62 are in their central positions, or when the liquid is locked in the cylinders 62.

Figure 11:
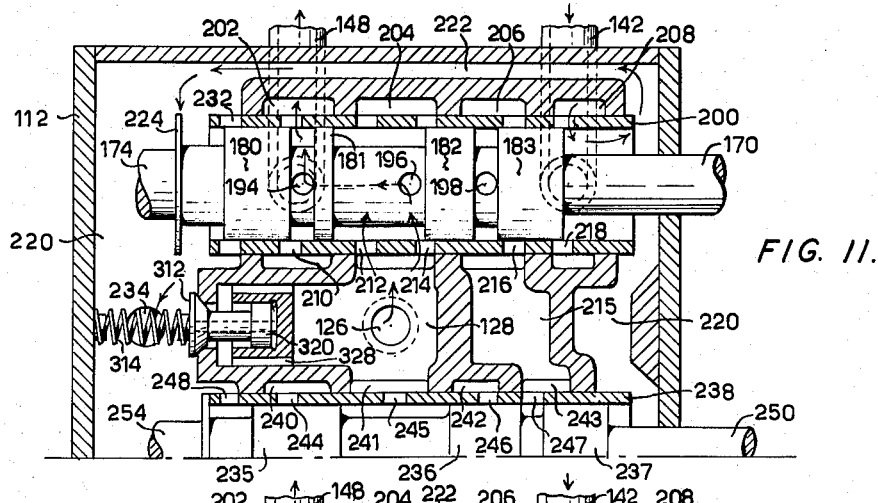
Figure 12:
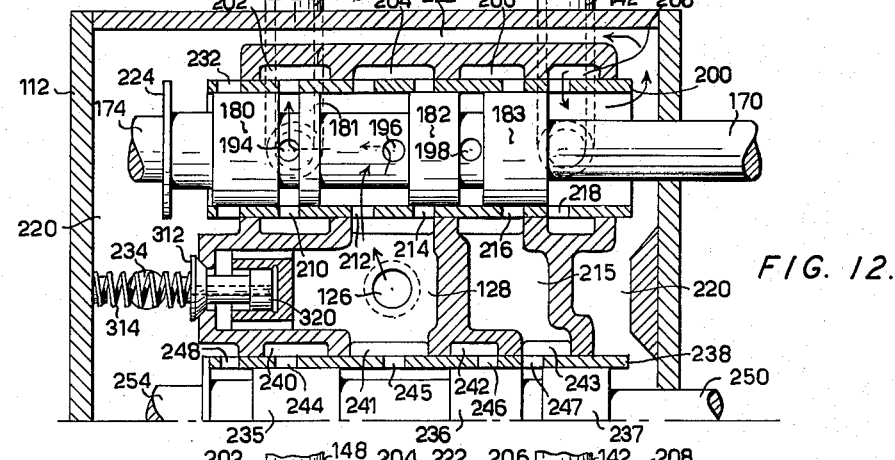
Figure 13:
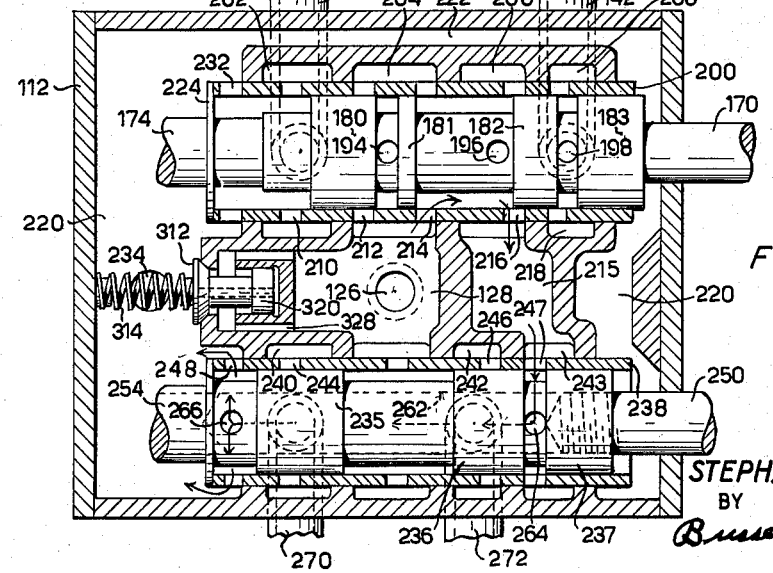

When the valve for the cylinders 62 is moved to the left by the counter-clockwise movement of bell-crank lever 278 to the positions shown in Figs. 11 and 12 to admit liquid under pressure to the lower ends of cylinders 62 from the high pressure chamber 128, through pipes 148, 140 and 136, to raise the lifting arm 48, together with the shovel 68, the lever 284 will be rocked clockwise to move the roller 290 to the right from the position shown in Fig. 7 and, when the cylinders 62 reach the position A shown in broken lines in Fig. 5, the roller 290 will be returned to the position shown in Fig. 7 and return the valve to the central position shown in Fig. 8, at which time the rams 63 will have been moved outwardly to the limit of their strokes, and in order to move the lifting arms beyond the position to which they have been moved by the full outward strokes of the rams, the rams must be retracted, the retracting of the rams 63 being accomplished by shifting the top valve to the position shown in Fig. 14 to reverse the flow of liquid to the cylinders. This shifting of the valve is accomplished by the clockwise movement of bell-crank lever 278 by the operator, which in turn moves roller 290 away from the path of cylinder 62 and, at the same time, raises lever 292 above the position shown in Fig. 5 by the raising of link 302 through the engagement of bell-crank 298 with toe 300 on bell-crank lever 278 with bell-crank 298.

This movement of the valve to the position shown in Fig. 14 will cause cylinder 62 to move from the position A to the position B, shown in Fig. 5, and during the latter part of its movement the lever 292 will move to the position shown by the engagement of the cylinder 62 with the toe 294 on the lever 292 and return the valve to its central position shown in Fig. 8 and lock the rams 63 by the liquid retained in both ends of the cylinders 62 by the valve.

The ram cylinders 62 are returned from the position B shown in Fig. 5, to the position C, which is also shown in Figs. 1 and 4, the valve is shifted to cause the flow of liquid to the cylinders 62 to cause the outward movement of rams 63, and as the cylinders approach and arrive at the position A the valve will be shifted to the central position, which is then moved further by the operator, to reverse the flow of liquid, between the ends of the cylinders to move the cylinders from the position A toward the position C, and when the lifting arms have reached the desired position, the operator returns the valve to its central position to retain the arms 48 in their desired positions.

As hereinbefore stated the shovel 68, or any other implement carried by a pivotal connection 64 with the ends of the lifting arms 48, is rocked about the pivotal connection by means of the rams 85, actuated by liquid in cylinders 86, or locked in working positions by the liquid, the flow or retention of which is controlled by the valve actuated by the valve stem 250, which is in turn connected by a bell-crank 306, which is also pivotally mounted on bracket 282, on which bell-crank 278 is mounted, and 308 is a link connecting the bell-crank 306 with the stem 250 of the valve.

The closed ends of the cylinders are pivotally connected to the pivot pins 77, while the ends of the rams 85 are pivotally mounted in the fork between members 84 and 80, see Fig. 2. The connections are such that when the rams are advanced the arms 78 will be advanced to rock the shovel clockwise and when retracted the shovel will be rocked counterclockwise, and during the movement of arms 78 the slotted portion of the arms will move over pin 77, or a roller on the pin.

In Fig. 4 I have diagrammatically illustrated the manipulation of the shovel from its digging or filling position to its forward dumping position, or over the cab of the tractor to its dumping position to the rear of the cab, as well as to the various positions of the shovel relative to the lifting arms.

As shown in Fig. 4, the lifting arms 48 as well as the bucket are in the full line positions with the engine running, the valves being in the position shown in Fig. 8, in which the flow of liquid at both ends of the four cylinders is cut off from the valve casing and would permit the free flow of liquid from the pump through the valve casing and the chamber 262 in the lower valve from the pressure chamber 128 to the low pressure chamber 220 back to the tank 100, locking all the rams against movement.

If it is desired to shovel material from the ground level, the arms 48 are raised slightly from the ground and locked in the desired position, and the tractor is moved forward, and the liquid is locked in the cylinders 86 to hold the shovel with the front thereof in the position shown in full lines in Fig. 4, and as the tractor is moved forward to move the shovel against a pile of material to fill the shovel. If it is desired to dig below the level shown in full lines in Figs. 1 and 4, the lower valve is shifted to tilt the shovel to the desired angle as shown in dotted lines in Fig. 1 or lower arms 48 below ground level.

When the shovel is filled, the lower valve is shifted to retract the shovel to the position shown in dotted lines at D in Fig 4, raised above the ground, and the valve is then shifted to its central position to prevent any movement of the shovel control arms 78 over pins 77. The upper valve is now shifted to admit liquid under pressure to raise the lifting arms into the front dumping position E, or towards the rear dumping position F.

The pivotal connections 46 and 77 of the lifting arms 48 and the shovel control arms 78, respectively, are closer to each other than the pivotal connections 64 and 87 between the shovel and the lifting arms 48 and the shovel control arms 78, so that the shovel will be continuously maintained in a substantially level position from the position shown in broken lines at D, to the upright position at F and the rear dumping position by rotating about centers 46 and 77.

If it is desired to dump the shovel at position E, the lifting arms 48 are brought to rest at position E, and the lower valve is shifted to admit liquid under high pressure to the cylinders 86 to advance rams 85 to move the shovel control arms 78 outward, to tilt the shovel to dumping position as shown at E'. If it is desired to dump at position F, the rams 63 must pass from the point of filling to position G, at which time the cylinders 62 will have reached the position A in Fig. 5 or when the axes of the cylinders 62 will be in alignment with the line H—H extending through pivotal points 72 and 46 in Fig. 4, and the upper valve will have been shifted to its central position by the engagement of the roller 290 by the cylinder 62 as it is moved to the position A, see Fig. 5.

It will be noted that the load in the shovel has not reached a vertical position at G, over the centers 46 and 77, and if no means were provided for shifting the upper valve to the central position automatically and it was merely manually shifted by the operator, the shovel would come to an abrupt stop before reaching position G if the operator shifted the valve too early, and would not pass the vertical position. If the upper valve is not shifted at the exact moment the load reaches the position G, the load will subject the apparatus to shock. At the exact time the rams 63 are fully extended, the valve must be shifted to reverse the flow of liquid to the cylinders 62, to retract the rams. However, all shock to the apparatus is prevented by the relief valve 166 in the pipe lines extending from the closed ends of the cylinders 62 to the valve permitting liquid to by-pass under maximum pressure to tank 100 when the valve is in neutral position locking all ports.

Assuming the shovel is to be moved from the filling position with the shovel in position D to the rear dumping position at F, liquid under pressure is delivered to the closed ends of cylinder 62 until the cylinder 62 engages roller 290 and when the axes of the roller and cylinder are substantially parallel to each other as shown with the cylinder at A in Fig. 5 the upper valve will be shifted to its central position, cutting any flow of liquid to or from the cylinders. As this flow is cut off just before the shovel reaches a vertical position over the centers 46 and 77, the shovel will move with sufficient momentum to carry the shovel past the vertical position above the centers at G, and will place the liquid in the closed ends in the cylinders 62 under a pressure slightly greater than the pressure required to lift the load, or at the pressure at which the relief valves 166 are set, and when this pressure is reached liquid will flow from the closed ends of the cylinders through the relief valves 166, through pipe connections 168 to the tank 100, while the inward movement of the rams 63 will form a void in the ram ends of the cylinders after the shovel has passed the vertical point above the centers, causing the shovel to move slowly and gradually to rest if the valve is not shifted to reverse the flow to retract the rams. This gives the operator a considerable space of time to shift the upper valve to cause the liquid to flow from the closed ends of the cylinders, to cause the cylinders to move to position B to shift the upper valve to the central position by engagement with the toe 294 of lever 292.

When the shovel has been brought to rest at position F in its upright position, the lower valve is shifted to retract rams 85 to retract arms 78, to shift the shovel to the position shown at K.

In order to prevent an excessive load on the pump when rams are extended or retracted to maximum positions or when the bucket is lodged under a load too heavy to move, there is provided a relief valve for taking care of overloads, shown in Figs. 8 and 11–15, which is directly located between the high pressure chamber 128 and the low pressure chamber 220, clearly shown in Fig. 8.

This valve comprises a conical head 312, urged to its seat by means of a spring 314, the pressure of which is adjusted by means of a screw 316, and 318 is a lock-nut for securing the screw in its adjusted position.

The head 312 is connected to a piston 320 by means of a stem, the piston being slidably mounted in a cylinder 324 closed at one end and in communication at the other end between the head 312 and the piston with the high pressure chamber 128 by means of ports 328, while the closed end of the cylinder 324 is in communication with the low pressure chamber by means of a port 326 extending through the piston 320 and the head 312, which port prevents the formation of a vacuum in the closed end of cylinder 324. As the area on the head 312 exposed to the high pressure from chamber 128 through ports 328 is only slightly greater than the area of piston 320 exposed to the high pressure from ports 328, a relatively light compression spring 314 may be used for taking care of the over-loads.

In Figure 4A, I have illustrated a shovel 68A which is the same as that shown in Figure 1, except it is provided with additional connections 87A for the arms 78 and a pair of prongs 68B removably secured thereto, which are also secured to the shovel as shown in Figure 2. The lifting arms 48 are also provided with a heel member 48A which is adapted to bear on the ground to form an abutment, for the purpose hereinafter described.

If the digger is used for digging in stony ground, tearing up an old roadbed or, where it is difficult to dig and free the shovel after filling, a shovel 68A, such as shown in Figure 4A, is substituted for the shovel 68 and the arms 76 are pivotally connected at 87A. The increased distance between connections 69 and 87A increases the leverage for rocking the shovel about the pivotal connections 69. If difficulty is experienced to rock the filled shovel to the position shown at D in Figure 4, the arms 48 can be lowered to rest the heels 48A on the ground to form an abutment for the arms 48 and thus prevent the tendency to raise the tractor, as well as prevent shock being transmitted to the connections between the lifting arms 48 and the frame 44 and 44ᵃ by the reciprocating motion of arms 78 to free the filled shovel, to rock it on pins 69 to the position shown at D in Fig. 4, the position to which the filled bucket is shifted for raising to the dumping position.

Figure 17:
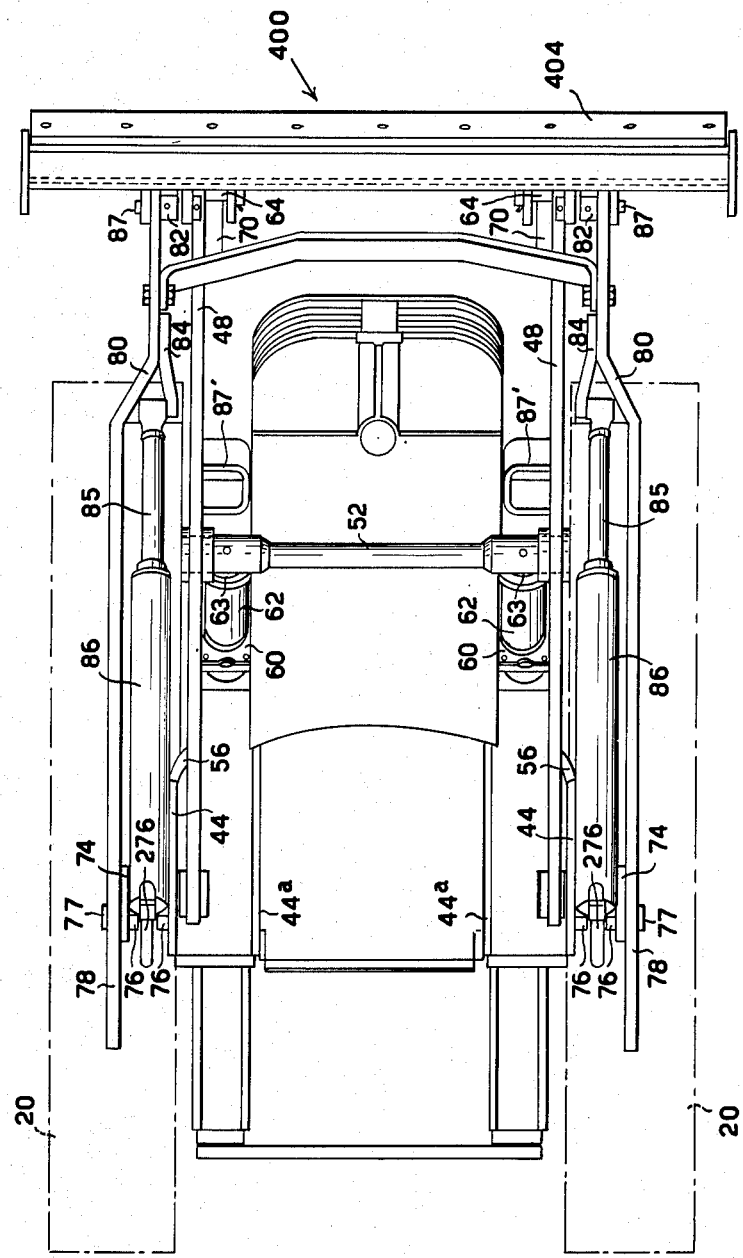
Fig. 17 is a plan view of Fig. 16.

In Figs. 16 and 17 I have illustrated a straight bulldozer head 400, attached to the apparatus by merely disconnecting the shovel 68 from the lifting arms 48 and the implement rocking arms 78, by removing pivot pins 64 and 87, respectively, positioning the head 400 in place of the shovel 68, and reinserting the pins.

The head 400 is provided with a curved face plate 402 and a scraper 404.

The upper valve shown in Fig. 8 is manipulated as previously described to place the scraper at the proper elevation for scraping, and locking it in proper position. The lower valve may be moved to its central position to hold the head at the desired angle, or the valve may be shifted to vary the angle of the head as desired.

If desired the angle of the head may be varied for digging, which can be done by the manipulation of the lower valve.

If material should stick to the curved face 402, the head can be elevated as shown in dotted lines by raising arms 48 above the ground and tilting the head, in the same manner as the shovel 68 is tilted or rocked.

Figure 18:
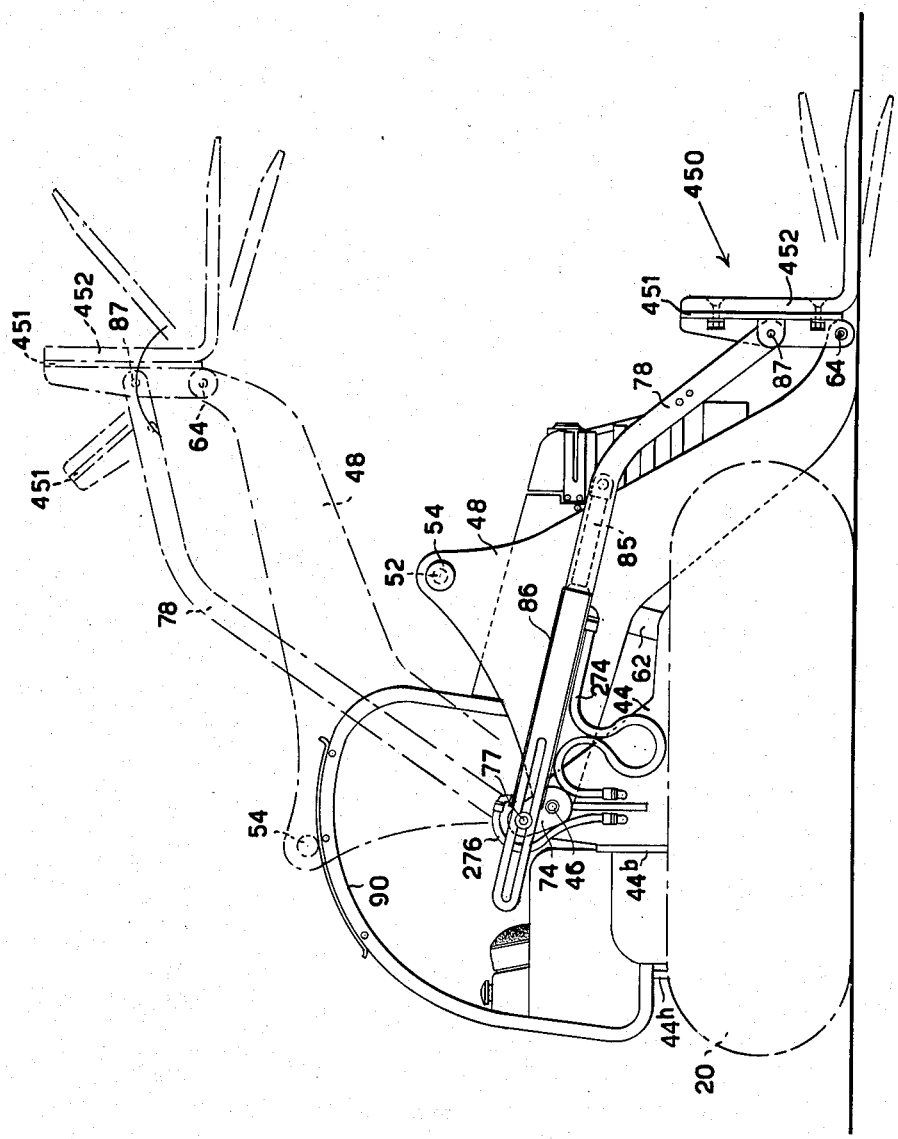
Fig. 18 is a side elevation of a lifting fork attached to the lifting arms and the implement manipulating arms.
Figure 19:
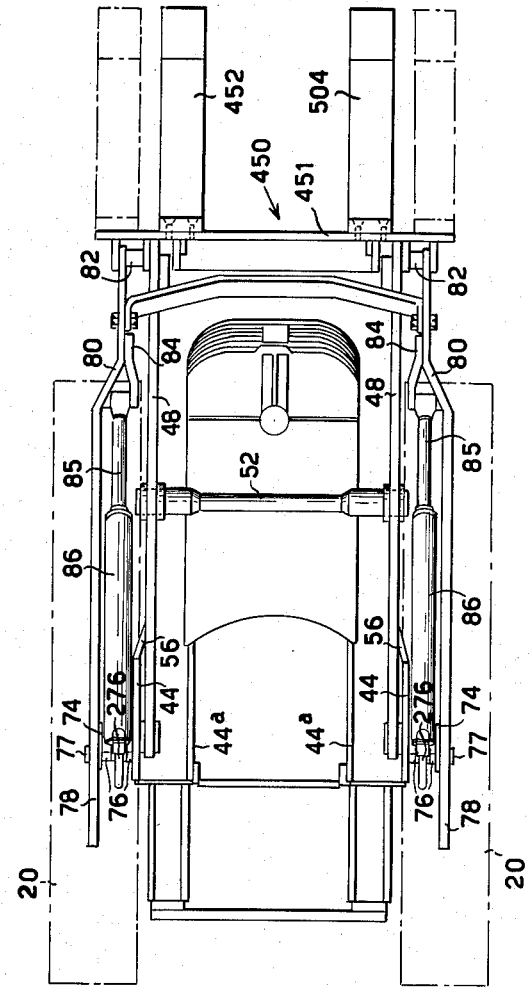
Fig. 19 is a plan view of Fig. 18.

In Figs. 18 and 19 I have shown a lift fork 450 attached to the lifting arms 48 and the implement rocking arms 78, which is connected to the arms by pivot pins 64 and 87, respectively, so the change can also be made by merely disconnecting one handling implement and connecting another in place thereof as in Figs. 16 and 17.

The lift fork is provided with a back plate 451, to which are connected pivot-engaging members corresponding to the pivot members on the shovel 68. Bolted to the front of the plate 451 are supporting arms 452, which are preferably adapted to be adjusted laterally as shown in dotted lines in Fig. 19.

As previously stated in connection with the centers of pivot pins 46 and 77, the lifting arms 48 and the rocking arms 78, respectively, are not so positioned relative to pivot pins 64 and 87 as to provide a true parallel link motion. This, however, is an advantage for handling boxes or bales to be transferred from one level to another for loading from the ground level to a truck or from one position to another on the ground as the arms 504 and back plate 502 can readily be maintained in an angular position during the raising and lowering of the fork by the lifting arms 48 by controlling the movement of the rams 85 through the medium of the lower valve for controlling the flow of liquid to and from the ends of cylinder 86. This controlling of the swing movement of the fork on the lifting arms permits the positioning of the fork to permit ramming the arms under the bales or boxes, rocking the fork to form a cradle for the boxes or bales and maintaining the desired angle of the fork during the raising and lowering, thereby permitting the loading and unloading of the fork by the angular position of the arms 504 thus providing power means for loading and unloading the fork by the angular position of the fork and the forward and backward movement of the tractor.

Figure 20:
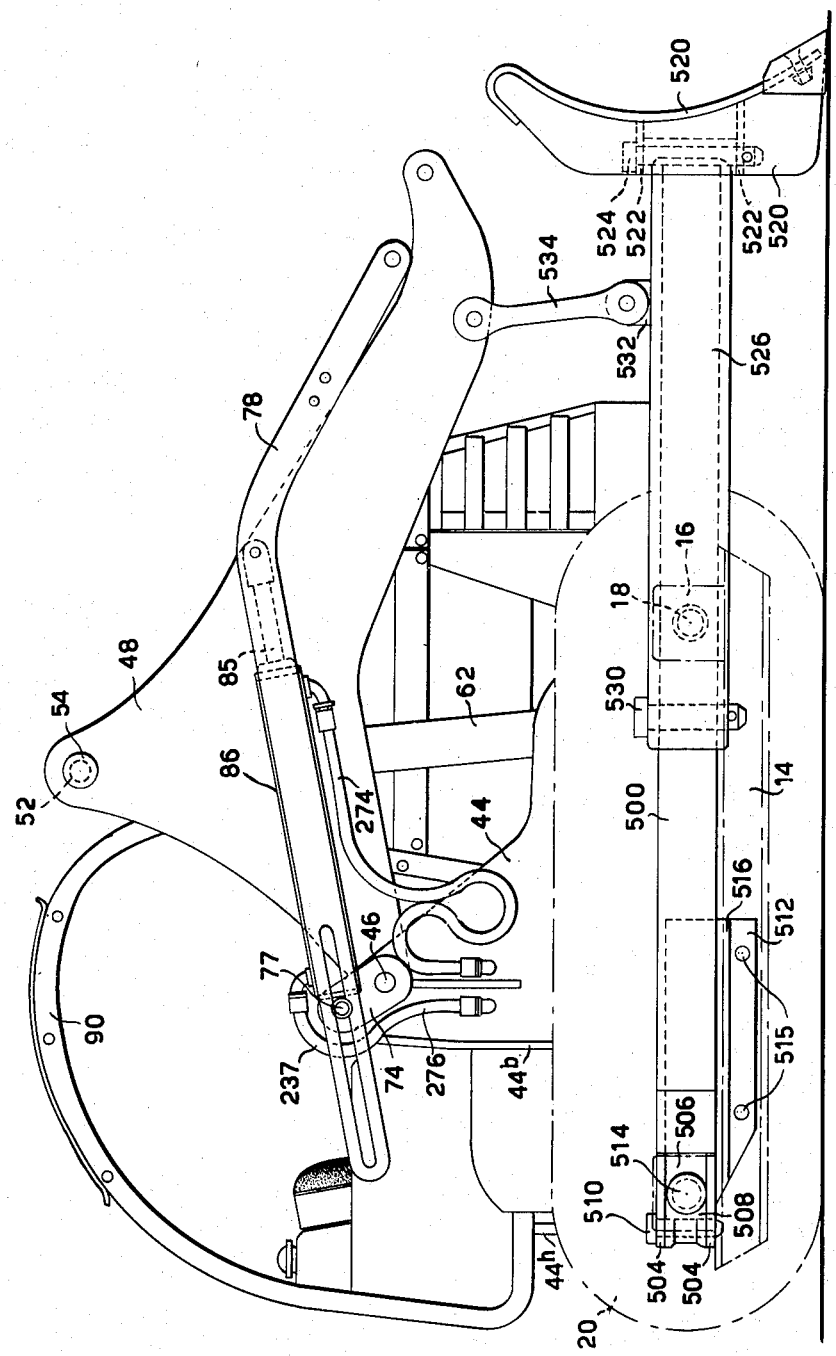
Fig. 20 is a side elevation of another form of bulldozer connected to the track frame of the tractor and the shovel lifting arms.
Figure 21:
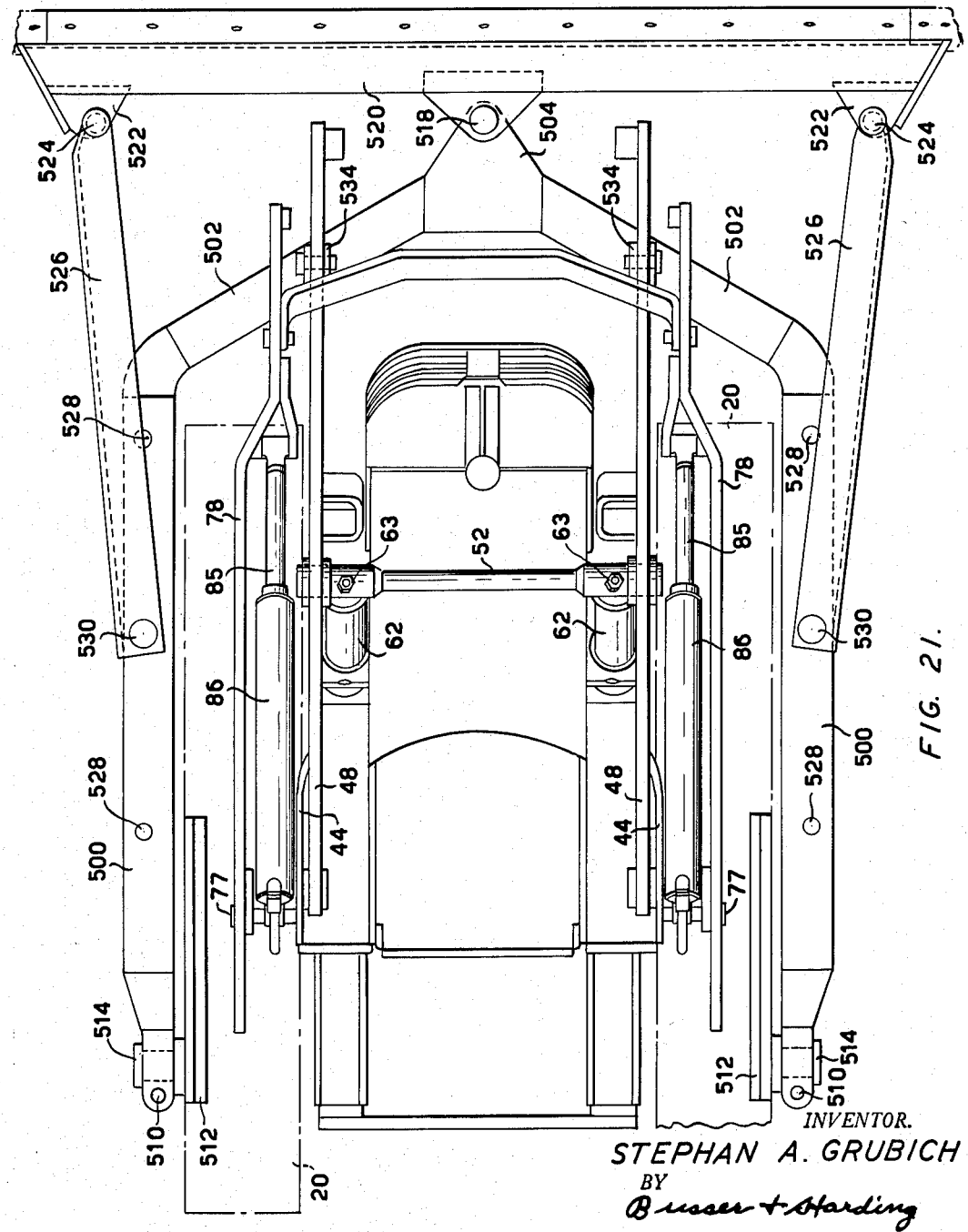
Fig. 21 is a plan view of Fig. 20.

In Figures 20 and 21, there is shown another form of bulldozer attached to the tractor track frame and comprising an A-shaped frame having parallel side members 500, the forward ends being connected to each other by angular members 502 which, in turn, are connected to each other by a gusset plate 504 extending forward of the frame.

The side frame members 500 are preferably formed of channel sections with the web cut away to form a fork at the ends with the flanges 504. Secured in the fork is the inner half 506 of a split bearing member and seated between the fork members 504 in engagement with member 506 is the other half 508 of the split bearing which is secured in position by a pin 510 extending through openings in the flanges 504 and the bearing member 508.

Secured to the outer channel member 14 of each of the track frames shown in broken lines is a plate 512, each being provided with a spindle 514 extending laterally therefrom on which the split bearings are mounted. The inner face of each plate 512 is seated against the outer edge of the upper flange of the track frame channel member and is provided with an offset at 516 which extends under the flange of the track frame channel member to position the face of the lower portion of plate 512 against the web of the track frame channel member.

The plate 512 as well as the web of the track frame channel member are provided with holes 515 for the reception of bolts so positioned as to place the axes of the spindles 514 in alignment with the axes of the rear axles of the tractor.

Pivoted to the forward end of the gusset plate by a pivot pin 518 is a bulldozer blade 520 and extending rearwardly from each end of the bulldozer blade are spaced plates 522.

Pivotally connected to each set of plates 522 by means of a pin 524 is one end of a link 526. The other end of each link 526 is also provided with an opening which may be brought into register with either of three sets of holes 528 in the side members 500 and secured thereto by a pin 530.

As shown in the drawings, the links 526 are positioned and secured to the side members extending through the central holes 528 in the side members 500 so the bulldozer is parallel to the axes of the tractor axles. It will be apparent that the bulldozer can be positioned at an angle to push the load to either side by changing the connections between the ends of the links 526 and the side members 500.

The angle members 502 are each provided with an upwardly extending projection 532 and pivotally connected to each projection and to one of the lifting arms 48 is a link 534 having a fork at each end which straddles the projections 432 or lifting arms 48.

By the manipulation of the rams 63 by the flow of liquid to and from the opposite ends of the cylinders 62 under the control of the operator through the medium of the upper valve in valve casing 112, the depth of the dozer blade can be held at the desired point for digging or scraping or varied by shifting the valve.

The tractor frame may be provided with plates 512 and, when the bulldozer is to be connected thereto, the A frame of the bulldozer can readily be attached, by uncoupling the shovel 68, to provide a clearer vision for the operator, raising the arms 48 and 78 by the rams 63 connecting links 534 to arms 48, removing pins 510 from bearing members 508 together therewith and blocking up the fork members 504 to a level for the reception of spindles 514, moving the tractor to position the spindles against bearing members 506, then inserting bearing members 508 and securing them in the fork with pins 510. The movement of the spindles into bearing members 506, the A frame will be properly positioned relative to the bearings, and, after the bearing members 508 are secured in the forks, the arms 48 can be lowered by the rams 63 to position the links relative to the projections 532 for the insertion of the pivot pins to secure the links 534 to the A frame of the bulldozer.

Figure 22:
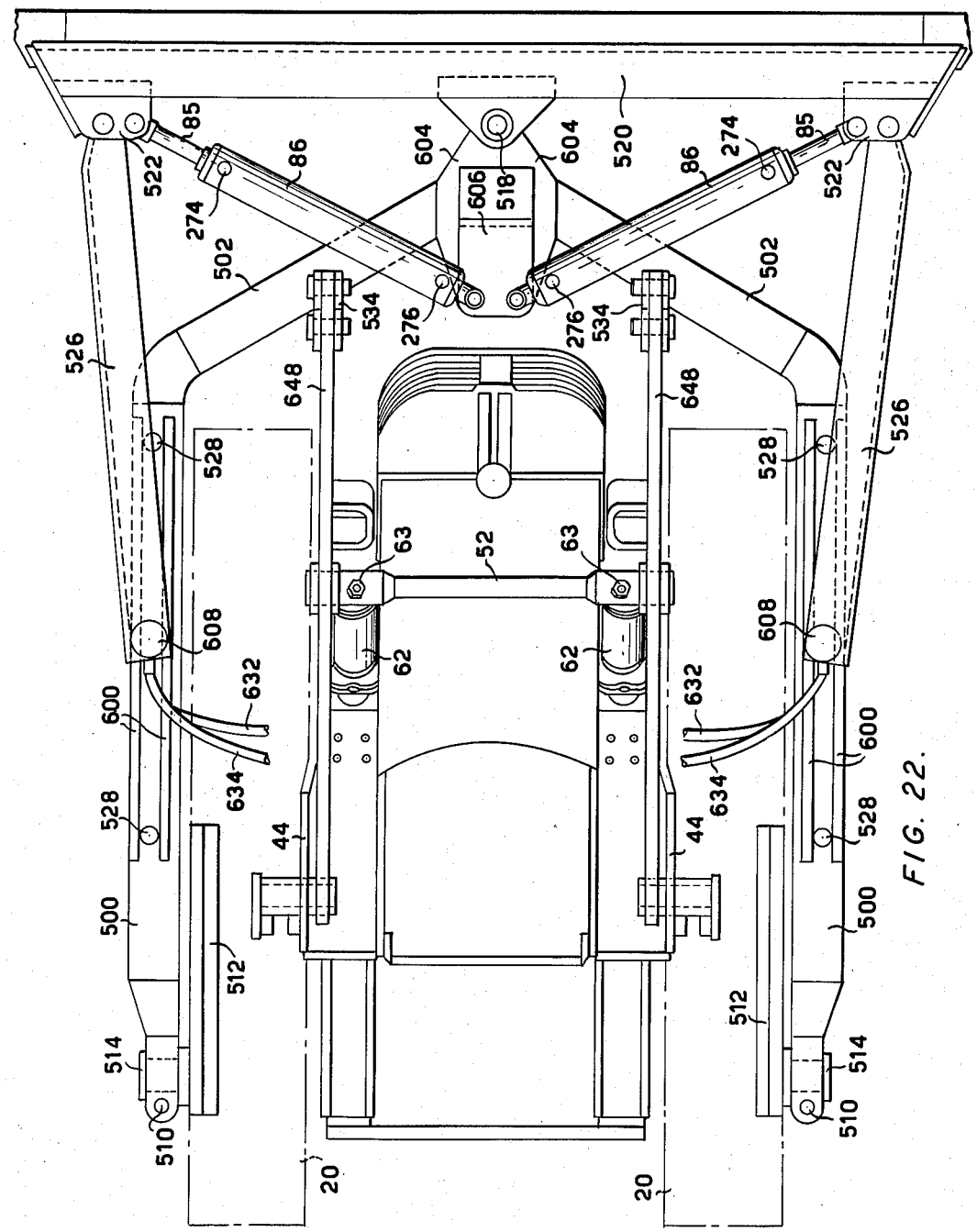
Fig. 22 is a side elevation of a bulldozer similar to that shown in Figs. 20 and 21, which is provided with controls for changing the angular position of the head by hydraulic means.
Figure 23:
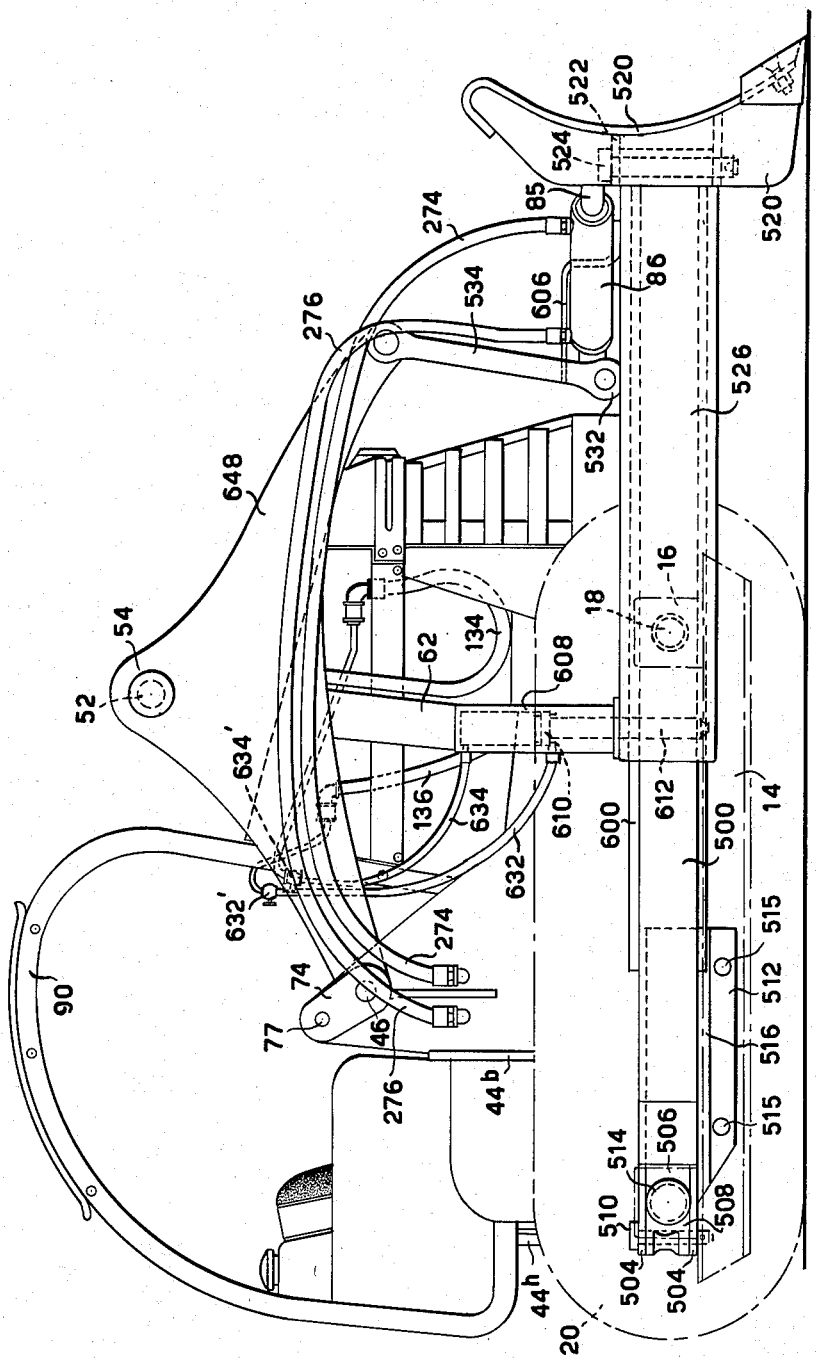
Fig. 23 is a plan view of Fig. 22.

The structure shown in Figures 22 and 23 is similar to that shown in Figures 20 and 21 differing in that the angle of the bulldozer head may be varied by hydraulic means whereby the operator may shift the blade without leaving the cab.

In order to accomplish the shifting of the head by hydraulic means, the lifting arms 48 are disconnected from rams 63 and their pivotal connections with the frame member 44 and lighter arms 648 may be positioned in place thereof, as shown in Figs. 22 and 23, the rams 63 being connected to the arms 648 to raise and lower the arms together with the A frame of the bulldozer in the same manner as the A frame is raised and lowered in Figures 20 and 21.

The arms 78, cylinders 86 and rams 85 for rocking the shovel 68 are also removed, and the cylinders and rams are disconnected from the arms 78 for the purpose hereinafter described. The structure of the A frame is identical with that shown in Figures 20 and 21, with the exception of the gusset plate 604 which is provided with a rearward extension and the upper face of each side member 500 is provided with two rail members 600 forming a groove between them for the purpose hereinafter described.

The same reference characters designating similar parts shown in other figures are applied to the parts in Figures 22 and 23. The bulldozer head 520 is also pivoted to the gusset plate 604 and connected to the gusset plate is an L-shaped member 606 having an upwardly extending portion and a rearwardly extending portion forming a fork between said rearwardly extending portion and the gusset plate.

The cylinders 86 and rams 85, which have been disconnected from the arms 78, and each ram 85 is pivotally connected between a set of plates 522 at the ends of the blade 520 while the end of each cylinder 86 is pivotally connected in the fork between member 606 and gusset plate 604. It will be apparent from the showing in Figure 22 that the blade 520 can be angularly shifted by the movement of the rams.

Connected to the upper face of each link 526 is a hydraulic cylinder 608 having a ram 610 therein, and, connected to the lower end of each ram is a pin 612 adapted to pass through holes 528 in the side members 500 for securing links 526 thereto. When the pins 612 are withdrawn from openings in the side members 500, they will clear the upper faces of the side members but will be maintained in the groove between the rails 600 which act as guides for the pins for maintaining the links 526 in proper relation to the side members 500 during the shifting of the head about the pivotal connection 518 with the A frame.

The pipe connections 134 from the valve casing 112 to the top of cylinders 62 for the lifting rams 63 as well as the pipe connections 136 from the valve casing 112 to the bottoms of cylinders 62 are identical with those for lifting the shovel 68 as shown in Figures 5 and 6.

Connected to the pipe 134 connected to the tops of cylinders 62 is a bleeder pipe 634 which is connected to the top of cylinders 608 and connected with pipe 136 connected to the bottoms of cylinders 62 is a similar pipe 632 connected to the bottom of cylinders 608. Each of the pipes 634 and 632 is provided with hand operated valves 634' and 632', respectively, located in the cab in reach of the operator, which are only opened when the operator desires to shift the head about its pivotal connection with the A frame.

The ends of cylinders 86 are connected to the valve casing 112 as in Figures 5 and 6 by pipes 276 and 274 (which for clearness have been shown as connected to the same side of the cylinders), but the pipes leading to the cylinders are crossed, that is to so supply the liquid under pressure to one cylinder 86 opposite to that of the other so that when one ram 85 is extended the other will be retracted.

When the operator desires to raise or lower the head 520, he manipulates the upper valve in casing 112 in the same manner as when raising and lowering the shovel 68 and, when shifting the head 520 about its pivotal point 518 with the A frame, the lower valve in the valve casing 112 is actuated for controlling the flow of liquid to and from cylinders 86.

If the operator desires to shift the head 520, he first manipulates the upper valve and raises the arms 648 a distance above the ground and then moves the valve to its central position. He then opens hand valves 632' and 634' and, since the lines are interconnected, the rams 610 will receive the same pressures as the cylinders 62; that is, when there is pressure on the lower portion of cylinder 62, there will be an equal pressure on cylinder 610 to pull pin 612 upward. In order to move pins 612, the operator shifts the upper valve in casing 112 to slowly further raise the arms 648 which will also cause liquid to flow into the lower ends of cylinders 62 and 608 and permit the liquid to flow from the other ends back to the tank 100 from cylinders 62 and 608.

The flow of liquid into the lower ends of cylinders 608 will withdraw the pins 612 from the openings 528 in the side members 500 but will not withdraw them from the grooves between rails 600. As soon as the pins 612 are withdrawn, the operator shifts the upper valve in valve casing 112 to its central position and then shifts the lower valve in the valve casing 112 to cause liquid to flow to and from cylinders 86 to shift the head in the desired direction and immediately after the pins have passed beyond the openings 528 from which they have been withdrawn, the operator shifts the upper valve to lower the rams 610 which will move the pins 612 into contact with the upper faces of side members 500, and, as soon as the operator has shifted the head 520 and links 526 to bring the pins 612 into register with the desired holes 528, the operator moves the upper valve controlling the flow to and from cylinders 86 to its central position and permits the lowering of rams 610 and 63 to fully insert pins 612 after which he closes valves 632' and 634' to lock the pins in their new positions after which the rams 63 can be operated in the usual manner for raising and lowering the arms 648 and the head 520 carried thereby.

In Figure 24, I have shown a side elevation of a portion of a digger mechanism such as is shown in Figure 1 for digging by means of a downward and forward motion towards the back of the tractor on which the framing for the digger is mounted. The other portion of the digger mechanism is shown in side elevation in Figure 24A. In these figures, the digging mechanism is shown in full lines and in dumping position in dotted lines.

In Figure 25, I have shown a plan view of Figure 24 and in Figure 25A I have shown a plan view of Figure 24A. However, in both Figures 25 and 25A, the portions as shown in dotted lines in Figures 24 and 24A are shown in full lines in dumping position.

In Figure 24, the bulldozer head 404 shown in Figures 16 and 17 has not been disconnected from the arms 48 and 78 and acts as a counterweight for the scoop and boom arms. However, rams 85 and their cylinders 86 have been disconnected from arms 78 and connected as hereinbefore described. In order to maintain line 78 and dozer head 400 in a fixed position on pivot pin 87, a link 804 has been positioned in place of rams 85 and their cylinders 86.

Extending through bearings 44S, connected to the brackets 44N mounted on 44J is a shaft 806 on which are rotatably mounted the inner ends of boom arms 808 which are connected to each other at their outer ends by a shaft 810 and intermediate their ends by a cross bar 812. The shaft 810 extends through a bearing member 811, the ends of which are connected to levers 818 forming a raising and lowering mechanism.

Extending upwardly from each of the boom arms 808 is a bearing member 814. Extending through said bearings is a shaft 816 to which the ends of the cylinders 86 are pivoted, the ends of the rams 85 being pivoted to the short ends of levers 818 by means of a pin 820. Connecting the ends of shaft 816 and cross bar 52 extending from one lifting arm 48 to the other is a cable 822, as shown in Figs. 24 and 25, or as a rigid link 822' as shown in Fig. 25B in which it is part of the lifting frame for raising and lowering the implement and holding the implement in working position during the forward movement of the tractor while digging.

Connected to the outer ends of levers 818 by means of a pin 824 is a bucket or scoop shovel 826, the rim of the scoop is also connected to levers 818 by struts 828 to rigidly hold the shovel in fixed relation to the ends of levers 818.

The connections of pipes 274 and 276 connecting cylinders 86 to the valve casing 112 is the same as in Figures 5 and 6.

In Fig. 25B, I have illustrated the operation of the digger shown in Figs. 24, 24A, 25 and 25A, which may be used for digging a trench and dumping the removed material at the side of a trench. The scoop 826 is shown in dumping position in broken lines at X, in scooping or digging position in full lines at Y and in its filled position in broken lines at Z.

As illustrated, a trench has been dug from the ground level to the deep trench level. The scoop 826 shown at Y is being moved along the arcuate broken line from position Y to position Z a slight distance in advance of the full line indicating the previous cut taken.

During the scooping the scoop actuating lever 818 is rotated about shaft 810 from the position Y toward the position Z by the outward movement of rams 85 by admitting liquid to the lower end of cylinders 86 as heretofore described, when the scoop is filled, the movement of the rams 85 is arrested and the liquid is locked in cylinders 86. The rams 63 are then retracted by admitting liquid to the upper ends of cylinders 62 to lower arms 48 to raise boom arms 808 through the medium of cables 822 to raise the scoop 826 above the ground level and retain them at that level by locking the liquid in cylinders 62. The tractor is then shifted to shift the scoop adjacent the trench to the dumping position. The scoop is dumped by admitting liquid to upper ends of cylinders 62 to raise the scoop to position X. After dumping, the tractor is then positioned for the next removal of material by the scoop. The scoop is lowered into position Y by the outward movement of rams 63 to lower the boom arms 808 with the scoop to position Y to again fill the scoop by the outward movement of rams 85 as previously described, and the tractor is moved forward the distance of the cut to be made. Shallow trenches may also be scooped out by means of the structure shown in Figs. 24 to 25B, inclusive, by using rigid links 822' in place of the cables 822, by positioning the scoop into digging position by the rams 85, then moving the tractor forward and maintaining the depth of the trench by positioning the raising and lowering frame formed by arms 48, links 822', boom arms 808 by rams 63, and, when the scoop is filled, raising the scoop above the ground, the tractor is now shifted to dumping position and the scoop is then dumped by advancing the rams 85 to tilt the scoop.

By positioning the scoop into digging position by rams 85, moving the scoop by the tractor to fill the same, raising the scoop from digging position by rams 63, and, then dumping as above described by use of rams 85, the manipulation of the implement is substantially the same as with the structure shown in Figs. 1 and 2.

The bulldozer shown in Figs. 26 and 27 is simple and compact and is similar to the bulldozer shown in Figs. 20 and 21 and in which light and short lifting arms are provided as well as a short A frame so that the bulldozer blade or head is close to the front end of the tractor. In this form, the blade supporting frame is also U-shaped and comprises side members 500 connected to each other at one end by a cross member 502, the other ends being connected to spindles 514 as described in connection with Figs. 20 and 21.

The bulldozer blade 920 is pivotally connected to each end of the cross bar 502 by means of pins 902, each extending through a pair of plates 904 extending from the bar 502 on opposite sides of an extension 906 on the back of the bulldozer blade 920. Extending upwardly from the bulldozer blade at each end portion thereof is a spaced pair of projections 908, and, pivotally connected between each pair of projections 908 by means of a pin 910 is one end of a lifting arm 948, the other end thereof being pivoted at 46 to the frame members 44.

The lifting arms 948 are connected to each other by a cross bar 52 mounted for rotation at its ends 54 in the lifting arms 948. Lifting rams 63 actuated by pistons in cylinders 62 as in structures hereinbefore described are connected to the hydraulic system by means of pipes 134 and 136. As the manipulating cylinders 86 and arms 78 are not used in connection with a straight bulldozer, the same have been removed and the hydraulic connections therefor have been closed by plugs 274' and 276'.

The bulldozer blade 920 can be raised to any desired position for scraping or pushing material, as the blade is maintained in operative position during raising and lowering by the substantially parallel motion of arms 948 and side members 500 about their respective pivotal connections 46 and 514, and their respective connections 610 and 902 to the blade 920, the blade being in operative position at the various elevations by controlling the flow of liquid to and from the ends of cylinders 62 by the valve mechanism hereinbefore described.

The structure shown in Figs. 1 and 2 is also adapted for use as a tractor crane as shown in Figs. 28–31 by removing the lifting arms 48 together with the shovel, the manipulating arms 78, cylinders 86 and rams 85.

The tractor crane also comprises a lifting frame 1000 having side arms 1048 pivoted to the supporting frame member 44 at 46 in the same position as the lifting arms 48 removed from the tractor were supported. These side arms 1048 are connected to each other by a bar 1052 mounted at its ends in the side arms 1048 for rotation as the bar 52 is mounted in the arms 48 in Figs. 1 and 2.

The ends of rams 63 extending from cylinders 62 are connected to bar 1052 for raising and lowering the frame 1000.

The frame 1000 is provided with short cross bars 1002 and a cross bar 1004 connecting the side arms 1048 and longitudinal bars 1005 extending from cross bar 1004 slightly beyond the inner ends of the cross bars 1002 connected thereto. The front ends of the side arms 1048 have converging extensions 1006 joined to each other by an enlarged portion 1008 parallel with the bars 1002 and 1004. The cross bar 1004 is also provided with an enlarged portion 1012 to which one end of each bar 1005 is connected and connecting the enlarged portions 1008 and 1012 to each other are four pairs of bars 1014, each pair being at 90° from adjacent pairs, pivotally mounted between each pair of bars 1014 is a roller 1016, see Fig. 31, two of the rollers being adjacent to the enlargement 1008, the other two being adjacent to the enlargement 1012 and above the first mentioned rollers.

The enlarged portions 1008 and 1012 are apertured to slidingly engage a hollow boom 1018 of keyhole shape throughout a portion of its length, and is provided with a hook 1040 on its ends, the annular peripheral portion engaging the rollers 1016, see Fig. 31. The radius of the inner surface of the cylindrical portion of the boom 1018 is the same as the radius of the periphery of the cylinders 85. Extending inwardly from the inner surface of the boom are two bosses 1020, see Fig. 30, the inner faces of the inner ends of bars 1005 are also provided with bosses 1022. One of the cylinders 86 and its ram 85 are dismounted from a manipulating arm 78 which was removed from a structure such as shown in Figs. 1 and 2, and is slipped into the rear end of the boom 1018 to position the end of the ram 85 between bosses 1020, and, when so positioned, a pin 1026 is passed through openings in the bosses 1020 and the end of the ram 85. Spacing washers 1024 are then positioned between the pivot end portion 1028 on the cylinder 86 and the bosses 1022 and a pin 1030 is slipped through the bosses, washers and the end portion 1028 of the cylinder so the cylinder is connected to the frame 1000 and the ram 85 to the boom 1018.

After the ram, cylinder and boom have been mounted in the frame 1000, the frame is pivotally mounted at 46 to the supporting frame members 44. The pipe connections 274 and 276 from cylinder 86 to the hydraulic system as well as to the cylinders 62 (not shown) are the same as in the structure shown in Figs. 5 and 6.

The frame 1000 with the boom is raised and lowered by controlling the flow of liquid to and from cylinders 62 as in other structures, while the outward and inward movement of the boom is controlled by the flow of liquid to and from cylinder 86 as shown in Figs. 5 and 6. As only one of the cylinders 86 is used, one end of each of pipes 274 and 276 shown in Fig. 6 is plugged.

The tractors in all of the structures shown may be provided with a track frame, supplemental frame and hydraulic system such as shown in Figs. 1–15, while the track frames in Figs. 1 and 2 may be provided with plates having pintles as shown in some of the bulldozer structures as well as supporting members for the rear axles and boom shown in Figs. 24 to 25B.

In Figures 32 through 42 I have shown a digger in accordance with this invention which is similar to the digger of Figure 1 and which is particularly adapted for use with a tractor having non-oscillating tracks, that is, tracks which are connected forward of the tractor axle by a fixed bar or the like. Both sides of the digger are identical with a few exceptions which are carefully detailed.

Adverting now particularly to Figures 32–34, an earth digger 1070 has a rear driving axle 1072 mounted in bearings 1074 which are secured to track frames 1076 mounted on either side of the tractor and formed of channel members.

Mounted on the axis between the bearings and between the channel members in the usual manner is the usual driving sprocket or track wheel (not shown). The front end of each track frame carries an idle sprocket (not shown). A conventional track is shown in outline at 1078 in Figures 32–34.

Referring now particularly to Figure 33, the engine supporting frame of the tractor is formed of two channel members 1080. Channel members 1080 are secured to a track channel connecting bar 1082. Bar 1082 is fixedly secured to track frames 1076 and, as will be apparent, prevents the separate oscillation of track frames as in the case of the mounting disclosed in Figures 1 and 3. All of these elements are so well known that a more detailed description would be superfluous.

Mounted on bar 1082 and on either side of the engine frames respectively, but separate therefrom, is a side frame 1084 having an outer member 1086 and an inner member 1088 and connected to each other by an end member 1090 and a bottom plate 1092. Frame 1084 is bolted to the rear of the digger as shown at 1094.

It will be particularly noted that frame 1084 is not directly connected to channel members 1080, thus eliminating the stress imposed on the channel members incident to the carrying of frame 1084 and its associated mechanisms.

A bracket 1093 is secured to the outside of member 1086 and together with member 1086 supports a bushing 1095 for pin 1096.

Pivotally mounted on pin 1096 is a bucket supporting and raising arm 1098, the forward ends of which are connected to each other by cross bar 1100, while the intermediate portions are connected to each other by a bar 1102, mounted at its ends in the shovel arms for rotation.

Pivotally mounted between each inner member 1088 and outer member 1086 or frame 1084 is a trunnion bracket 1104 for supporting ears 1105 (see Fig. 35) secured to a cylinder 1106 of a hydraulic ram 1108 for raising and lowering the bucket arm 1098. Each ram 1108 is secured by means of a saddle to cross bar 1102.

The cylinders 1106 and rams 1108 are pivotally secured to the side frames and arms, respectively, so that the rams will lie in a common plane with the arm pivots when the shovel is in the dead center overhead position. It will further be noted that the pivot points of the cylinders are located forward of the arm pivot points to give a greater front lifting force to accommodate a loaded shovel and a smaller lifting force to return an empty shovel.

A shovel 1110 is pivotally secured to each arm 1098 at 1112. Shovel 1110 is pivotally connected to a ram 1114 at 1116. Ram 1114 extends from a hydraulic cylinder 1118, the end of which is pivotally mounted to outer frame member 1086 at 1120.

The cab 1122 is provided with a protective covering 1124 having an arcuate shape to permit cross-bar 1102 to clear it.

Referring now particularly to Figures 35 through 39, the hydraulic system will be described. Particularly in Figures 35 and 36, it will be seen that each bucket cylinder 1118 is connected at one end thereof to a hydraulic line 1130 and at the other end to a hydraulic line 1132, the lines 1130 and 1132 being connected to a valve 1134.

Each arm cylinder 1106 is connected at one end thereof to a hydraulic line 1138 and at the other end to a hydraulic line 1140, the hydraulic lines 1138 and 1140 being connected to valve 1142.

A liquid circulating pump 1144 is supplied with liquid from tank 1146 and in turn supplies a flow of liquid to valves 1134 and 1142 respectively.

Figure 38:
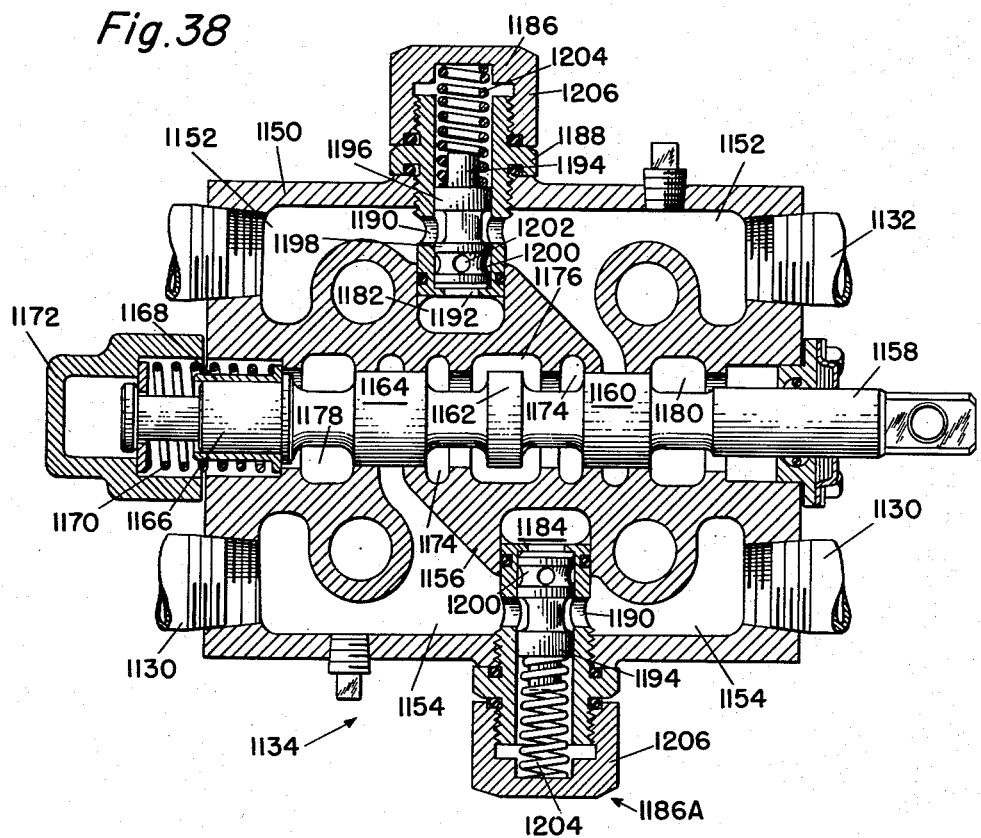
Fig. 38 is a sectional view of the bucket control valve.
Figure 39:
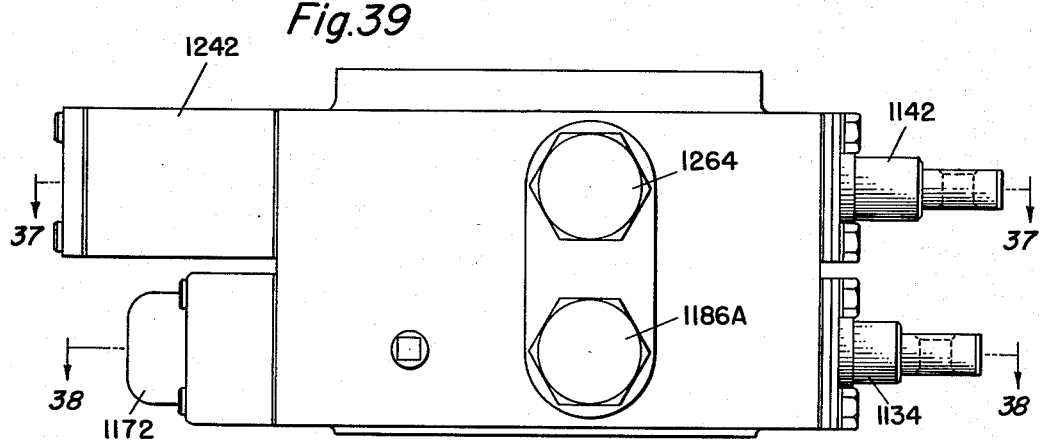
Fig. 39 is a front elevation of the valves of Figs. 37 and 38.
Figure 41:
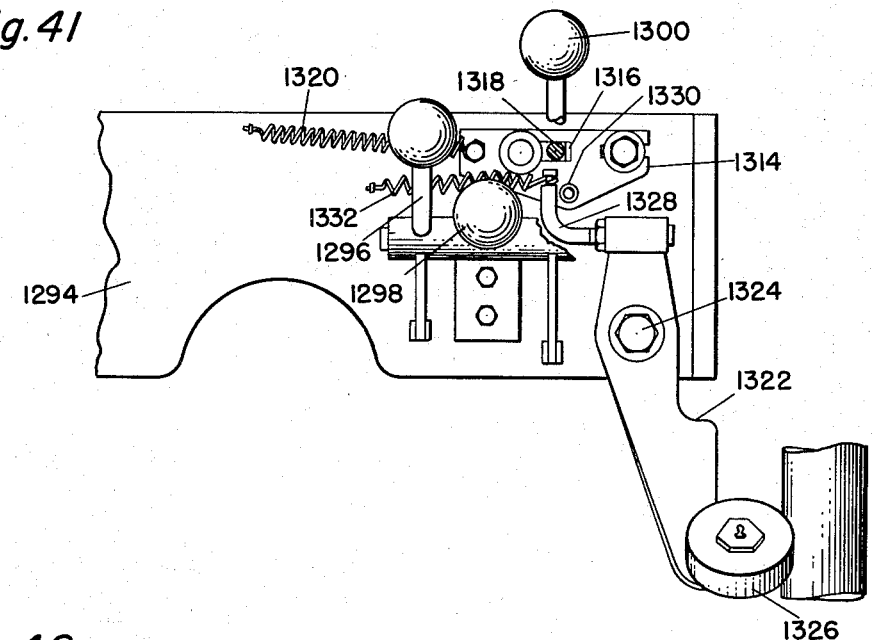
Fig. 41 is a rear elevation of the controls for the valves of Figs. 37, 38 and 40.
Figure 42:
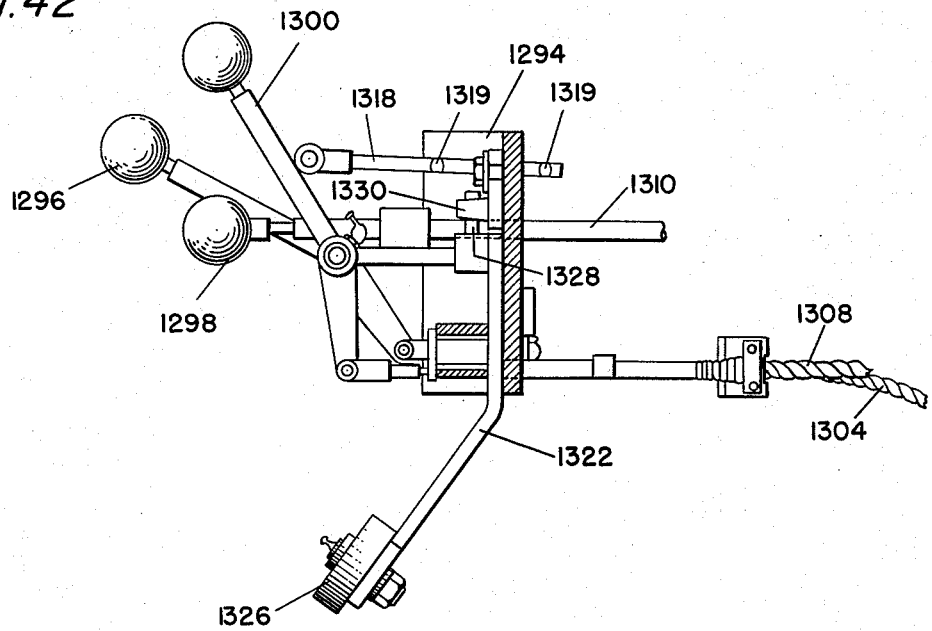
Fig. 42 is a side elevation of the controls of Fig. 41.

Referring now to Figure 38, valve 1134 has a casing 1150. Within casing 1150 there is formed two separate chambers 1152 and 1154, chamber 1152 being connected to hydraulic lines 1132 and chamber 1154 being connected to hydraulic lines 1130.

A body portion 1156 is located between chambers 1152 and 1154 and supports a valve stem 1158. Valve stem 1158 is provided with spools 1160, 1162 and 1164. End 1166 of stem 1158 is provided with a sleeve 1168 which engages a coil spring 1170 in end cover plate 1172. Spring 1170 acts, in conjunction with sleeve 1168, to bias stem 1158 to the right as viewed in Figure 38 to a neutral position. The central passages located at 1174 are connected to the pressure side of the pump. Passage 1176 is connected for discharge into tank 1146. Passages 1178 and 1180 are exhaust passages which are connected to the intake side of the pump. Passages 1182 and 1184 are similarly connected to the intake side of the pump.

A relief valve 1186 connects chamber 1152 and passage 1182. Valve 1186 has a body portion 1188 having opposed openings 1190 leading from the interior of the body to chamber 1152 and an opening 1192 at the end of body 1188 leading to passage 1182. A valve stem 1194 is provided with spools 1196 and 1198. Spool 1198 is provided with an annular recess 1200 which has an opening 1202 which leads out of the end of valve stem 1194, permitting the flow of fluid into passage 1182. A spring 1204 biases stem 1194 downwardly and is held in position by a cap 1206.

Spool 1196 has a larger surface exposed to the fluid admitted to the valve body through openings 1190 than has spool 1198. These differential areas, together with the strength of spring 1204, are selected to provide for the ready upward movement of stem 1194 when the pressure in chamber 1152 rises to a predetermined figure. It will be readily seen that when stem 1194 moves upwardly and exposes the annular recess 1200, the fluid in chamber 1152 will pass through openings 1190 and 1202 into passage 1182 through which it will be exhausted to the pump.

The differential relief valve shown at 1186A is identical with valve 1186 and it connects passage 1184 with chamber 1154.

Referring now particularly to Figure 37, valve 1142 has a casing 1210. Within casing 1210 there is formed two separate chambers 1212 and 1214, chamber 1212 being connected to hydraulic lines 1140 and chamber 1214 being connected to hydraulic lines 1138. As set forth above, lines 1138 and 1140 are connected to lift arm cylinders 1106.

A body 1218 is located between chambers 1212 and 1214 and carries a valve stem 1220. Valve 1220 is provided with spools 1222, 1224, 1226 and 1228.

Spool 1228 engages a sleeve 1230 which in turn engages a coil spring 1232. Spring 1232 abuts against a washer 1234 which surrounds stem 1220. Washer 1234 abuts against flange 1236 at the end of stem 1220.

Washer 1234 also engages washer 1238 which abuts against coil spring 1240 contained in housing 1242. An abutment 1244 in housing 1242 limits the travel of washer 1238 to the right, as viewed in Figure 37. A stop member 1245 limits the travel of stem 1220 to the left, as viewed in Figure 37.

It will be seen that this arrangement of springs acts to bias stem 1220 into the neutral position shown in Figure 37 irrespective of which direction the stem is moved.

Passages 1246 and 1248 in body portion 1218 are connected to the pressure side of the pump. The central passage 1250 is connected for discharge into tank 1146. The passages indicated at 1252, 1254, 1256 and 1258 are connected to the inlet end of the pump.

A differential relief valve shown at 1260 is identical with differential relief valve 1194 shown in Figure 38 and, therefore, need not be described in detail here. Relief valve 1260 connects chamber 1212 with passage 1252.

A ball check valve 1264 between passage 1254 and chamber 1214 has a seat 1266, a ball 1268, a coil spring 1270 and a cap 1272.

A flow control valve 1274 connects chamber 1212 to tank 1146. This valve is shown in detail in Figure 40. Flow valve 1274 comprises a casing 1276, the interior of which is connected to chamber 1212 of valve 1142 by means of conduit 1278. Conduit 1278 is restricted in size to provide for a retarded flow of fluid out of chamber 1212. Valve 1274 has an operating hand, i. e., 1280, which is connected to a valve barrel 1282. Barrel 1282 has a groove portion indicated at 1284 which coincides with the top of conduit 1278. Groove portion 1284 has an opening 1286 which leads into a bore 1288 in the center of the barrel and is plugged at 1287. In the position shown in Figure 40 a passage 1289 leading from bore 1288 registers with line 1291 (see Figure 37), which leads to tank 1146.

Reference to Figure 43 will further clarify the hydraulic system. Here the pump 1144 is shown with its intake side connected to tank 1146 through passages 1336, manifold 1338 and line 1340. Manifold 1338 is connected to passages 1178, 1180, 1182 and 1184 of valve 1134 and passages 1252, 1254, 1256 and 1258 of valve 1142.

The pressure side of pump 1144 discharges into passage 1342, which is connected to passages 1174 of valve 1134 and passages 1246 and 1248 of valve 1142. Line 1344 discharges into tank 1146 and is connected to discharge passages 1176 and 1250 of valves 1134 and 1142, respectively. A pressure relief valve 1346 interconnects passages 1342 and 1336.

Referring now particularly to Figure 36, the controls for the above discussed valves are located adjacent dashboard 1294. Bucket control lever 1296, flow control lever 1298 and arm control lever 1300 are pivotally mounted as shown at 1302. Lever 1296 is connected to cable 1304 which in turn is connected to pivoted link 1306 which is secured to the stem 1158 of valve 1134. Control lever 1300 is secured to cable 1308 which is secured to stem 1220 of valve 1142 by means of another pivoted link 1306.

Control lever 1298 is secured to cable 1310 which in turn is secured to lever 1280 of valve 1274.

As shown particularly in Figures 35, 36, 41 and 42, a plate 1314 mounted for horizontal sliding has an opening 1316 through which a lever 1318 having notches 1319 passes. Lever 1318 is pivotally connected to lever 1300. Plate 1314 is biased to the left (as Figure 1 is viewed) by means of a coil spring 1320 and is adapted to enter notches 1319.

A lever 1322 is pivotally mounted at 1324 and has a roller 1326 at its outer end. At the other end is secured a right-angled rod 1328 which is adapted to engage a pin 1330 which projects from plate 1314. Bent rod 1328 has secured thereto a coil spring 1332 which acts to pull rod 1328 to the left away from pin 1330 as viewed in Figure 31. When rod 1328 is thus biased to the left, roller 1326 is positioned in the path of right hand cylinder 1106.

The embodiment of this invention shown in Figures 32 through 41 will be further clarified by a description of its operation. Referring now particularly to Figure 34, it will be seen that as the arms 1098 are moved around their respective pivot points, rams 1114 act to move shovel 1110 about pivot 1112 in order to keep the contents of the shovel from dumping out. As the arms 1098 move the shovel upwardly, rams 1114 rotate the shovel counterclockwise about pivot 1112 as viewed in Figure 34. Again, when the shovel passes over dead center, ram 1114 acts to rotate the shovel clockwise about this pivot point, as viewed in Figure 34.

It will be noted that the relative location of the pivot points for ram cylinders 1118 and arms 1098 is responsible for this leveling action. The pivot point 1120 of ram cylinders 1118 are located above and to the rear of the respective pivot points 1096 of arms 1098. It will be noted, of course, that this leveling is accomplished without changing the relative position of rams 1114 and cylinders 1118.

Again, it will be observed that a unique feature of this invention as embodied in Figures 34 through 41 is that a single pair of lifting rams which are directly connected to the lifting arms are utilized to carry the shovel from the front digging position upwardly over the digger to a rear dumping position and to return the shovel to a front digging position. The particular novelty involved in providing for such an arrangement is found in the location of the pivot points of the arms and the arm rams.

Assuming now that the bucket as shown in full lines in Figure 34 is fully loaded by the forward movement of the digger, the arms 1098 are elevated by pulling lever 1300 all of the way back so as to pull valve stem 1220 of valve 1142 to the right as viewed in Figure 37, causing spool 1224 to open passage 1248 to chamber 1212 and at the same time block passage 1248 from discharging into passage 1250. This connects chamber 1212 to the pressure side of the pump. At the same time spool 1226 has moved to open passage 1256 to chamber 1214, thus permitting fluid to exhaust from chamber 1214. Thus, pressure is supplied to the lower end of cylinders 1106 through lines 1140 while fluid is exhausted from the upper sides of these cylinders through lines 1138. It will be noted that lever 1300 is held in this position by a detent working together with latch plate 1314.

As arms 1098 are moved about pivot 1096, the right hand cylinder 1106 moves to the left, as viewed in Figure 36. When the bucket reaches the dead center overhead position, the right hand cylinder 1106 contacts roller 1326, actuating latch plate 1314 to release lever 1318 from notch 1319 and thus free lever 1300. As previously noted, valve 1142 is spring biased to the neutral position and, therefore, it now returns to this position. The center flow control lever 1298 is at the same time pulled back to open flow control valve 1274. This permits the arms to descend to the rear of the digger into the position shown at B for rear dumping. At this point, bar 1102 comes to rest on the tractor frame as shown at C.

Now, in order to dump the bucket, lever 1296 is pulled rearwardly, moving valve stem 1158 to the right, as viewed in Figure 38. This positions spools 1162 and 1164 so as to block passage 1174 from discharge passage 1176 and provide a connection between chamber 1152 and passage 1174, thus connecting chamber 1152 to the pressure side of the pump. The movement of spool 1164 connects chamber 1154 to discharge passage 1178. Thus, fluid is supplied under pressure through lines 1132 to the upper ends of cylinders 1118 and exhausted from the other end of these cylinders, thus resulting in a downward movement into dumping position.

After dumping, the bucket is returned to its normal loading position by pushing lever 1296 inwardly, which moves the valve stem to the left as viewed in Figure 38 and connects chamber 1154 to the pressure side of the pump through passage 1174 and simultaneously connects chamber 1152 to discharge passage 1180.

Lever 1298 is now brought forward to close control valve 1274 and lift control lever 1300 is again pulled all of the way back and held in this position by notch 1319, cooperating with latch plate 1314. The right hand cylinder 1106 contacts roller 1326 when the shovel reaches the overhead position and, as we have seen before, this results in lever 1300 going to the center position and valve 1142 going to the neutral position. The operator moves lever 1300 forward as soon as roller 1326 is contacted, causing spool 1226 to move to the left, as viewed in Figure 37, connecting chamber 1214 to passage 1246, thus, connecting chamber 1214 to the pressure side of the pump. At the same time spool 1222 moves to the left and connects chamber 1212 to discharge passage 1258 and blocks passage 1248 from discharge 1250. The upper ends of cylinders 1106 are thus supplied with fluid under pressure while the lower ends are exhausted, which brings the shovel down to the digging position again.

Front dumping is accomplished by raising the arms 1098 to the position shown at D in the Figure 34. When reaching this position, control lever 1300 is placed in the center position, thus placing valve 1142 in the neutral or hold position. The bucket is dumped by admitting pressure under fluid to the lower end of cylinders 1118 by pushing control lever 1296 inwardly and thus moving valve stem 1158 to the left as viewed in Figure 38 and connecting chamber 1154 to passage 1174, thus providing fluid under pressure in lines 1130. At the same time spool 1160 moves to the left and connects chamber 1152 to exhaust passage 1180, permitting fluid to be exhausted through lines 1132.

The arms can be lowered by an alternative method by pushing flow control lever 1300 all of the way forward and forcing valve stem 1220 to the left against stop member 1245. The fluid in chambers 1212 and 1214 can then float in any direction, thus providing for a slow downward movement of arms 1098. It will be noted that when stem 1220 is in this position spool 1224 is moved to the left sufficiently to block the connection between chamber 1214 and passage 1246. Hence, passage 1246 is open to discharge passage 1250 and chamber 1214 is connected to passage 1256. Chamber 1212 is connected to passages 1248 and 1258. This results in a floating condition.

Differential relief valves 1186, 1186A and 1260 protect the hydraulic system when valves 1134 and 1142 are in the neutral position shown in Figures 37 and 38 and are set for a higher pressure than relief valve 1346 so that the latter valve takes care of any excess pressure developed when these valves are not in the neutral position.

Relief valve 1260 performs an additional beneficial function in that when the bucket reaches dead center and valve 1142 is placed in the neutral position, valve 1260 will function if the operator is slow to, for example, use the flow control valve 1274. This prevents the stalling of the shovel in the dead center position when the operator is inefficient.

Ball check valve 1264 is used to prevent the drawing of a void in the tops of cylinders 1106. As the arms 1098 are descending valve 1264 opens to connect chamber 1214 to manifold 1338 through passage 1254.

Applicant does not desire to be limited except as set forth in the claims.

This application is a continuation-in-part of application filed by me December 9, 1948, Serial No. 64,296 and now abandoned.

What is claimed is:

1. A material handling apparatus adapted to dig at one end and dump at the opposite end comprising a tractor, a pair of arms pivotally mounted on said tractor, a bucket secured to the ends of said arms, means to adjust the angular relationship between the bucket and the arms, a hydraulic system including a source of liquid under pressure, a pair of lifting rams pivotally mounted on the tractor at a point between the pivot points of the arms and the digging end of the tractor and below said pivot points of the arms, said lifting rams being respectively pivotally secured to said arms at points substantially above the pivotal connections of the arms to the tractor when the arms are in digging position and substantially below the pivotal connection of the arms to the tractor when the arms are in the opposite dumping position, said rams having a stroke adapted to raise said bucket to an overhead position, and valve means for controlling the flow of liquid to and from said rams to effect the lifting of said arms from one end of the tractor to pass the bucket through the overhead position and to effect control of lowering of the arms at the opposite end of the tractor.

2. A material handling apparatus in accordance with claim 1, characterized in that the pivotal connections to the lifting rams and the pivotal connections between the arms and the tractor lie in a substantially common plane when the bucket is in the dead center overhead position.

3. A material handling apparatus in accordance with claim 1, in which the means to adjust the angular relationship between the bucket and the arms comprises a pair of rams pivotally secured to the bucket and pivotally secured to the tractor, and valve means for controlling the flow of liquid to and from said rams.

4. A material handling apparatus in accordance with claim 1, characterized in that automatic means shift said valve means to a neutral position when the bucket reaches the vicinity of the dead center overhead position, and a relief valve in the hydraulic system between said valve means and said lifting rams.

5. A material handling apparatus in accordance with claim 1, in which the means to adjust the angular relationship between the bucket and the arms comprises a bucket arm on each side of the tractor, each bucket arm having one end pivotally connected to the bucket and the other end slidably and pivotally mounted on a pin fixedly secured to the tractor, a pair of rams pivotally connected to the bucket arms, respectively, and pivotally mounted respectively on the pins on which the bucket arms are mounted, and valve means for controlling the flow of liquid to and from said rams.

6. A material handling apparatus in accordance with claim 1, in which the hydraulic system includes a liquid circulating connection to both ends of the rams, a valve for controlling the flow of liquid to and from the rams to shift the arms from digging position to dumping position by shifting the valve to one position to move the rams to their outermost positions and then shifting the valve to a reversed position to retract the rams to position the bucket in dumping position, a lever for shifting the valve having a member in the plane of one of the rams and arranged to be engaged thereby just prior to the time the bucket reaches the dead center position to cut off the flow of liquid to the rams.

7. A material handling apparatus adapted to dig at one end and dump at the opposite end comprising a tractor, a pair of arms pivotally mounted on said tractor, a bucket secured to the ends of said arms, means to adjust the angular relationship between the bucket and the arms, a hydraulic system including a source of liquid under pressure, a pair of lifting rams pivotally mounted on the tractor at a point between the pivot points of the arms and the digging end of the tractor and below the pivot points of the arms, said lifting rams being respectively pivotally secured to said arms at points substantially above the pivotal connections of the arms to the tractor when the arms are in digging position, the pivot points of each lifting ram and the pivot points of the arms lying in a common plane when the bucket is in the dead center overhead position and said rams having a stroke adapted to raise said bucket to the dead center overhead position, and valve means for controlling the flow of liquid to and from said rams to effect the lifting of said arms from one end of the tractor to pass the bucket through the overhead position and to effect control of lowering of the arms at the opposite end of the tractor.

8. A material handling apparatus adapted to dig at one end and dump at the opposite end comprsing a tractor, a pair of arms pivotally mounted on said tractor, a bucket secured to the ends of said arms, means to adjust the angular relationship between the bucket and the arms, a heel member secured to each of said arms and adapted to bear on the ground to form an abutment for the arms, a hydraulic system including a source of liquid under pressure, a pair of lifting rams pivotally mounted on the tractor at a point between the pivot points of the arms and the digging end of the tractor and below the pivot points of the arms, said lifting rams being respectively pivotally secured to said arms at points substantially above the pivotal connections of the arms to the tractor when the arms are in digging position, the pivot points of each lifting ram and the pivot points of the arms lying in a common plane when the bucket is in the dead center overhead position and said rams having a stroke adapted to raise said bucket to the dead center overhead position, and valve means for controlling the flow of liquid to and from said rams to effect the lifting of said arms from one end of the tractor to pass the bucket through the overhead position and to effect control of lowering of the arms at the opposite end of the tractor.

9. A material handling apparatus in accordance with claim 7, characterized in that the means to adjust the angular relationship between the bucket and the arms comprises a pair of bucket rams pivotally secured to the tractor, said bucket rams lying in vertical planes different from the vertical planes in which said arms lie, the pivotal connections between the bucket rams and the tractor being higher than the pivotal connections between the tractor and the arms and the pivotal connections between the bucket arms and the bucket being higher than the pivotal connections between the bucket and the arms when the apparatus is in digging position.

References Cited in the file of this patent

UNITED STATES PATENTS

| | | |
|---|---|---|
| 1,535,381 | Stage | Apr. 28, 1925 |
| 2,019,938 | Stephens | Nov. 5, 1935 |
| 2,418,251 | Drott | Apr. 1, 1947 |
| 2,427,968 | Hoover | Sept. 23, 1947 |
| 2,482,612 | Drott et al. | Sept. 20, 1949 |
| 2,490,724 | Williams | Dec. 6, 1949 |
| 2,518,096 | Thorne | Aug. 8, 1950 |
| 2,529,338 | Hoover | Nov. 7, 1950 |
| 2,537,010 | Andersen | Jan. 9, 1951 |
| 2,560,674 | Westall | July 17, 1951 |
| 2,625,755 | Drott | Jan. 20, 1953 |